(12) United States Patent
Matsuda et al.

(10) Patent No.: US 9,150,172 B2
(45) Date of Patent: Oct. 6, 2015

(54) VEHICLE-SIDE CONNECTOR AND METHOD OF ASSEMBLING IT

(71) Applicant: Sumitomo Wiring Systems, Ltd., Yokkaichi, Mie (JP)

(72) Inventors: Toshiyuki Matsuda, Yokkaichi (JP); Toshifumi Ichio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/219,262

(22) Filed: Mar. 19, 2014

(65) Prior Publication Data
US 2015/0147905 A1 May 28, 2015

(30) Foreign Application Priority Data

Mar. 19, 2013 (JP) .................... PCT/JP2013/057881
Nov. 25, 2013 (JP) .................................. 2013-242677

(51) Int. Cl.
*B60R 16/033* (2006.01)
*B60L 11/18* (2006.01)
*H01R 13/58* (2006.01)
*H01R 13/717* (2006.01)

(52) U.S. Cl.
CPC .............. *B60R 16/033* (2013.01); *B60L 11/18* (2013.01); *H01R 13/5833* (2013.01); *H01R 13/7175* (2013.01)

(58) Field of Classification Search
CPC . H01R 13/7175; H01R 13/641; H01R 13/465
USPC ......... 439/490, 489, 488, 456, 459, 564, 565, 439/573
See application file for complete search history.

(56) References Cited

U.S. PATENT DOCUMENTS

| | | | | |
|---|---|---|---|---|
| 5,062,807 | A * | 11/1991 | Guss, III | 439/490 |
| 5,458,496 | A * | 10/1995 | Itou et al. | 439/34 |
| 6,123,569 | A * | 9/2000 | Fukushima et al. | 439/456 |
| 7,554,034 | B2 * | 6/2009 | Smith | 174/53 |
| 8,226,284 | B2 * | 7/2012 | Markyvech et al. | 362/540 |
| 8,288,651 | B2 * | 10/2012 | Smith | 174/53 |
| 8,573,994 | B2 * | 11/2013 | Kiko et al. | 439/188 |
| 8,845,155 | B2 * | 9/2014 | Rotenberg et al. | 362/485 |
| 2003/0194906 | A1 * | 10/2003 | Arkin et al. | 439/490 |
| 2009/0023329 | A1 * | 1/2009 | Mehnert et al. | 439/490 |
| 2012/0258617 | A1 | 10/2012 | Osawa | |
| 2012/0322302 | A1 * | 12/2012 | Mori | 439/573 |
| 2015/0102776 | A1 * | 4/2015 | Said | 320/109 |

* cited by examiner

*Primary Examiner* — Abdullah Riyami
*Assistant Examiner* — Nelson R Burgos-Guntin
(74) *Attorney, Agent, or Firm* — Gerald E. Hespos; Michael J. Porco; Matthew T. Hespos

(57) ABSTRACT

A vehicle-side connector (10) is provided for connection to a battery of a vehicle. The vehicle-side connector includes a housing main body (30) for mating with a charging connector (50) that is connected to a charger. An indication device (20) with LED indicators (21) is mounted into the housing main body (30) and insulated wires (27) are drawn out from the LED indicators (21). Wire holders (28) are provided in the indication device (20) and hold the insulated wires (27) against a pulling force when the insulated wires (27) are pulled. The housing main body (30) includes mounting portions (35) to be mounted to a body of the vehicle and partition walls (22D) are formed between the wire holders (28) and the mounting portions (35).

6 Claims, 26 Drawing Sheets

VEHICLE-SIDE CONNECTOR AND METHOD OF ASSEMBLING IT

BACKGROUND

1. Field of the Invention

The invention relates to a vehicle-side connector.

2. Description of the Related Art

U.S. Patent Application Publication No. 2012/0258617 discloses a vehicle-side connector connected to a battery of a vehicle. A charging connector connected to a charger is connectable to the vehicle-side connector, and charging is performed while the vehicle-side connector and the charging connector are connected properly. The charging connector has a lock arm, and a lock is provided on the tip of the lock arm. The lock of the lock arm engages a locked portion on the vehicle-side connector to hold the connectors in a properly connected state.

Proper connection of the vehicle-side connector and the charging connector may be confirmed by a locking sound made when lock of the lock arm engages the locked portion. However, the properly connected state cannot be confirmed visually. An indicator, such as an LED lamp, has been considered for directly visually confirming a properly connected state. However, a wire drawn out from the indicator may be pulled to damage a joint of the indicator and the wire. Accordingly, measures taken for a case where the wire is pulled are urgently needed.

The invention was completed to prevent the damage of a joint part of an indicator and a wire when the wire drawn out from the indicator is pulled.

SUMMARY OF THE INVENTION

The invention relates to a vehicle-side connector to be connected to a battery of a vehicle. The vehicle-side connector has a fitting that can mate with a charging connector connected to a charger. An indication device with at least one indicator is mounted to the fitting of the vehicle-side connector, and at least one wire is drawn out from the indicator. At least one wire holder is provided in the indication device and is configured to hold the wire against a pulling force. Additionally, the fitting has at least one mounting portion to be mounted to a body of the vehicle, and at least one partition wall is formed between the wire holder and the mounting portion. The wire holder ensures that a pulling force on the wire drawn out from the indicator will not damage the joint between the indicator and the wire. Further, the partition wall prevents a movement of the wire toward the mounting portion so that the wire cannot be caught in the mounting portion.

The wire holder may include at least one hook that may be formed integrally or unitarily to a bolt fastening portion on a peripheral wall of the indicator. The wire may be arranged at least partly between the hook and the bolt fastening portion. The wire may be pulled strongly and a strong force may be applied to the hook. However, such a force will be received together with the bolt fastening portion so that the wire is held firmly. Further, the wire is arranged between the hook and the bolt fastening portion and will not be caught in the bolt fastening portion.

A clearance having a smaller diameter than the wire may be formed between an extending end of the hook and an end edge of the indication device substantially facing the extending end. Accordingly, the wire cannot be detached through the clearance between the extending end part of the hook and the end edge of the indication device.

The partition wall may be connected to the end edge of the indication device substantially facing the extending end of the hook. Thus, the wire can be guided by the partition wall immediately after the wire is hooked on the hook.

The partition wall may be arranged at least partly between the bolt fastening portion and the mounting portion, and the wire can be arranged easily therebetween.

These and other features and advantages of the invention will become more apparent upon reading the following detailed description of preferred embodiments and accompanying drawings. Even though embodiments are described separately, single features thereof may be combined to additional embodiments.

DETAILED DESCRIPTION OF THE PREFERRED EMBODIMENTS

Figure 26:
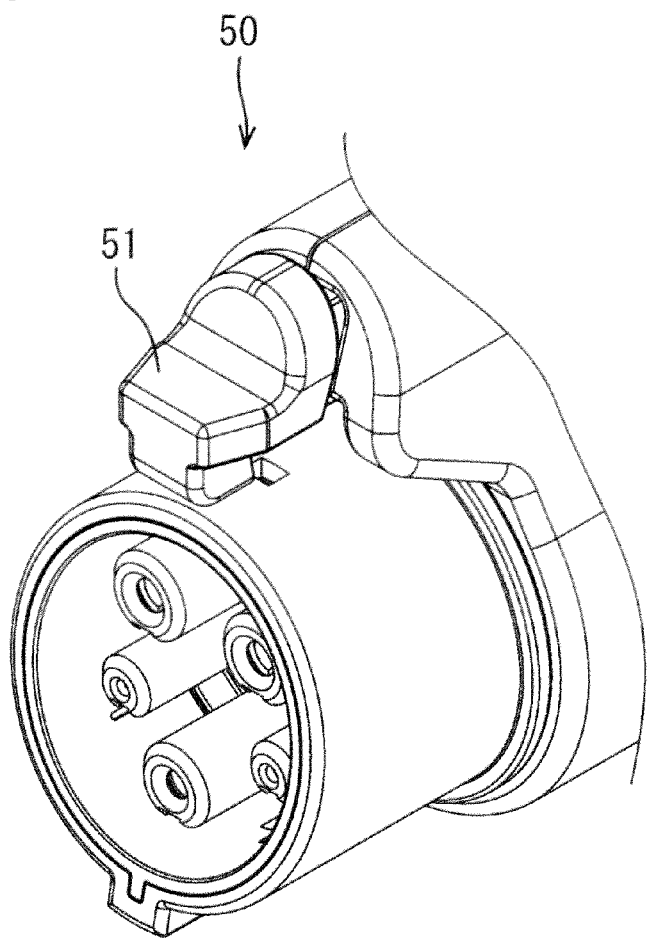
FIG. 26 is a perspective view of a part of a charging connector when viewed obliquely from front.

A first embodiment of the invention is described with reference to FIGS. 1 to 21. A vehicle-side connector 10 of this embodiment is connectable to a battery (not shown) installed in a vehicle via at least one wire W, and a charging connector 50 (see FIG. 26) connected to a charger is connectable thereto from the front. Proper connection of the charging connector 50 to the vehicle-side connector 10 enables power to be applied for charging the battery. A lock 51 is provided on an upper part of the charging connector 50, as shown in FIG. 26, for holding the connectors 10, 50 together.

Figure 1:
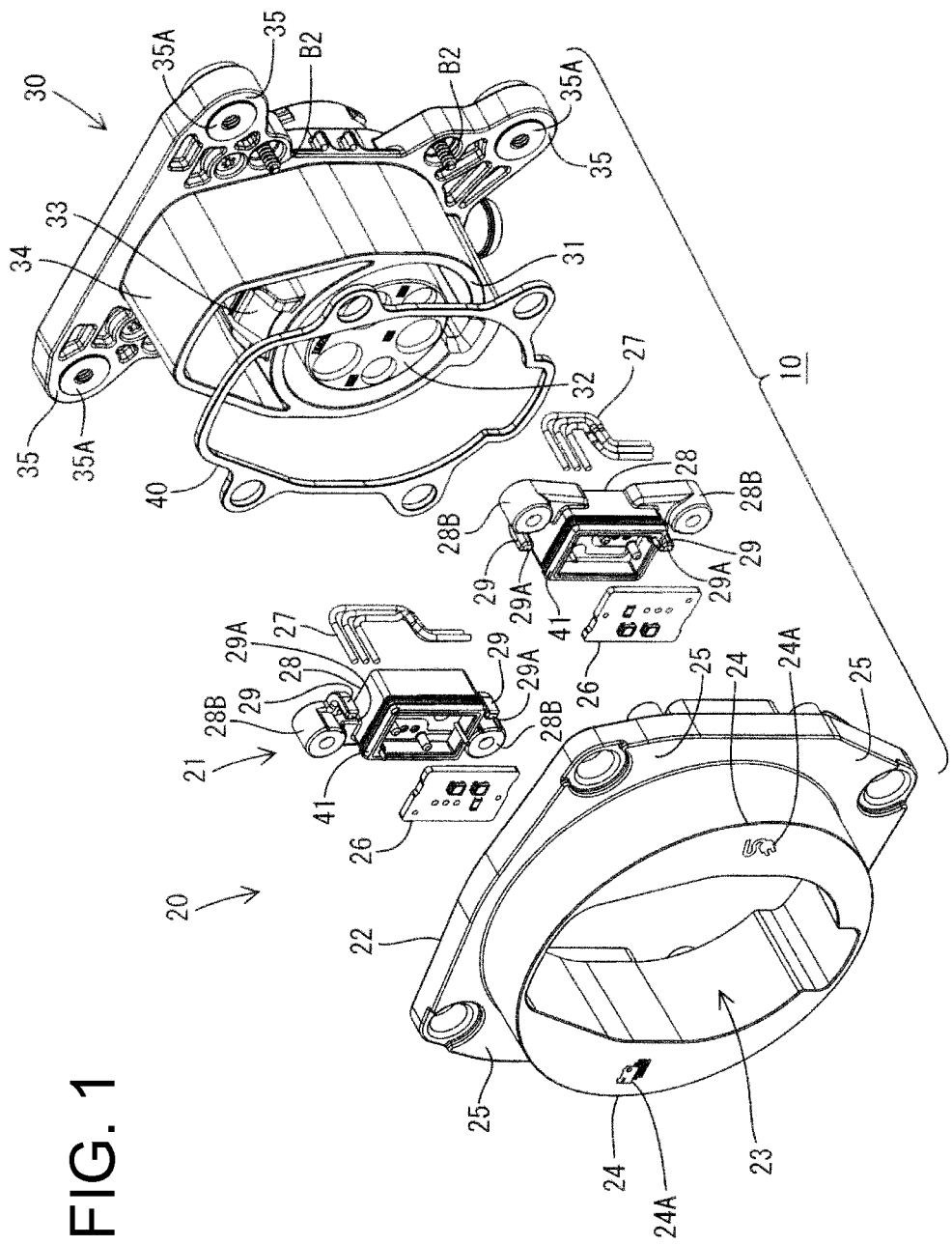
FIG. 1 is an exploded perspective view of a vehicle-side connector in a first embodiment when viewed obliquely from the front.

As shown in FIG. 1, the vehicle-side connector 10 includes at least one LED indication device 20 that has LED indicators 21 built in a bezel 22. A housing main body 30 is assembled with the LED indication device 20 from behind, and a packing 40 is sandwiched between the LED indication device 20 and the housing main body 30 from the front and rear ends. The housing main body 30 includes a fitting tube 31 for receiving the charging connector 50 and a terminal accommodating portion 32 is formed in this fitting tube 31 for receiving round pin-shaped vehicle-side terminals (not shown).

A locked portion 33 is formed on an upper part of the outer peripheral surface of the fitting tube 31 and can be locked by the lock 51 of the charging connector 50. The lock 51 and the locked portion 33 engage each other when the charging connector 50 is fit into the fitting tube 31 of the vehicle-side connector 10 to hold the charging connector 50 and the vehicle-side connector 10 in a properly connected state. A substantially U-shaped protection wall 34 is connected to the upper surface of the outer periphery of the fitting tube 31 to cover at least part of the locked portion 33.

Brim-shaped mounting portions 35 project from the outer peripheral surface of the housing main body 30 (e.g. lower two from the outer peripheral surface of the fitting tube 31 and upper two from the outer peripheral surface of the protection wall 34). Collars 35A are embedded in projecting ends of the respective mounting portions 35. The housing main body 30 is fixed to a body of the vehicle by inserting bolts through the collars 35A and tightening them into the body of the vehicle.

Figure 2:
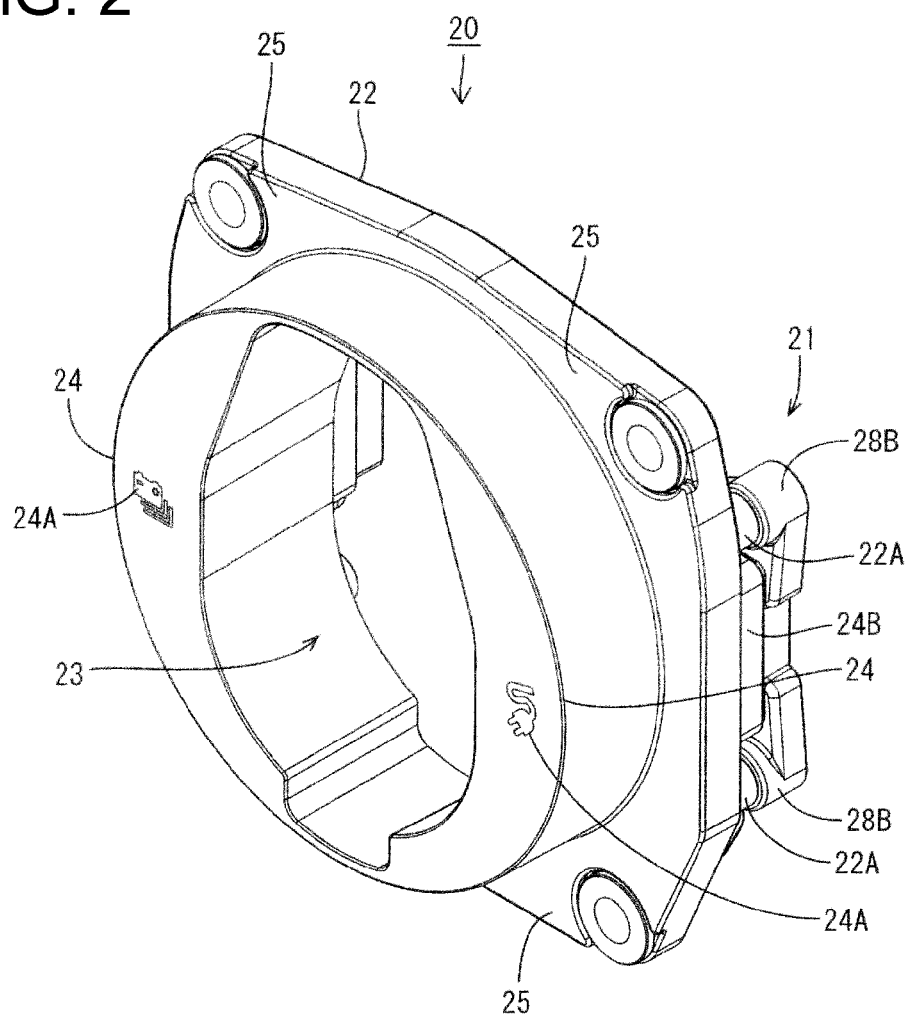
FIG. 2 is a perspective view of an indication device when viewed obliquely from the front.

As shown in FIG. 2, the bezel 22 of the LED indication device 20 includes an insertion hole 23 for allowing insertion of the fitting tube 31 and the protection wall 34 of the housing main body 30. Substantially cylindrical LED accommodating portions 24 are formed adjacent to and substantially around the insertion hole 23 of the bezel 22. Thus, the LED accommodating portions 24 substantially surround the fitting tube 31 of the housing main body 30 over substantially the entire circumference. Brim-shaped flanges 25 are formed on the outer peripheries of the LED accommodating portions 24. The respective flanges 25 project from the outer peripheral surfaces of the LED accommodating portions 24 and are coupled to each other. As shown in FIG. 1, the packing 40 is sandwiched between the respective flanges 25 of the LED accommodating portions 24 and the mounting portions 35 of the housing main body 30 for sealing between the housing main body 30 and the bezel 22.

Figure 3:
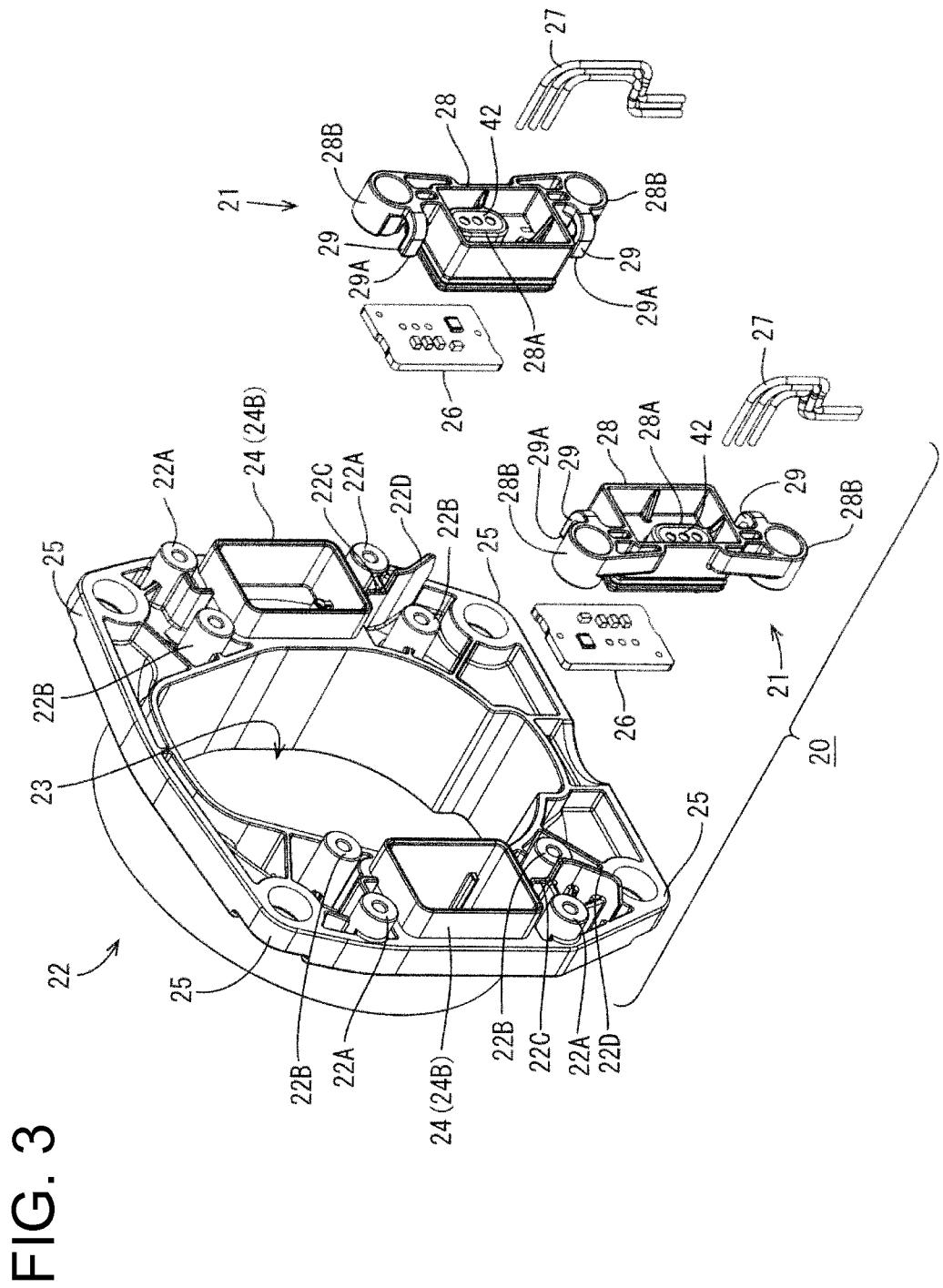
FIG. 3 is an exploded perspective view of the indication device when obliquely viewed from behind.

As shown in FIG. 3, the rear surface of the bezel 22 has fastening portions 22A for fixing the LED indicators 21 and fastening portions 22B for fixing the housing main body 30. The fastening portions 22B for fixing the housing main body 30 are closer to the insertion hole 23 than the fastening portions 22A for fixing the LED indicators 21.

Light emitters 24A are formed on the front surfaces of the LED accommodating portions 24 at opposite lateral sides of the insertion hole 23, as shown in FIG. 2. The light emitters 24A are semi-transparent and are made integral to parts of the LED accommodating portions 24 other than the light emitters 24A by two-color molding. The LED indicators 21 are arranged inside the light emitters 24A. A mark indicating a battery charging state, a plug inserted state or the like is lighted and indicated or visualized by emitting light from LEDs in the light emitters 24A.

As shown in FIG. 3, the LED indicator 21 includes an LED substrate 26 on which the LED is mounted, insulated wires 27 connected to the LED substrate 26, and a wire holder 28 for collectively holding the insulated wires 27 and the like. The insulated wire 27 has an electrically conductive core covered by an insulation coating. The core is connected electrically to a circuit board formed on the LED substrate 26 e.g. by soldering.

Two LED accommodating portions 24 are provided, and each has two mounting portions 24B in which the LED indicators 21 are to be mounted. The mounting portions 24B have vertically long rectangular openings that are open backward at the opposite lateral sides of the insertion hole 23 on the rear of the bezel 22. The left and right LED indicators 21 have common components and are substantially point-symmetrical. Specifically, the LED indicator 21 mounted in the left LED accommodating portion 24 can also be mounted in the right LED accommodating portion 24 if rotated by 180°. As a matter of course, the LED substrates 26, the insulated wires 27, the wire holders 28, seal rings 41 and rubber plugs 42 of the LED indicators 21 are substantially point-symmetrical.

As shown in FIG. 1, the wire holder 28 is a substantially rectangular box, and the seal ring 41 is fit on the outer peripheral surface thereof. The seal ring 41 is sandwiched between the outer peripheral surface of the wire holder 28 and the inner peripheral surface of the mounting portion 24B when the wire holder 28 is mounted into the mounting portion 24B of the LED accommodating portion 24 from behind to provide sealing between the wire holder 28 and the mounting portion 24B.

As shown in FIG. 3, a rubber plug mounting portion 28A is formed in the wire holder 28 for holding the rubber plug 42, and the insulated wires 27 are to be inserted through this rubber plug mounting portion 28A. The rubber plug 42 includes through holes arranged so that the insulated wires 27 penetrate therethrough. The rubber plug 42 provides sealing between the rubber plug mounting portion 28A and the insulated wires 27 by mounting the rubber plug 42 into the rubber plug mounting portion 28A with the insulated wires 27 inserted through the through holes.

Two bolt fastening portions 28B are formed unitarily on opposite upper and lower end parts of a peripheral wall of the wire holder 28. Bolts B1 (see FIG. 5) are inserted through the bolt fastening portions 28B and are tightened into fastening portions 22A provided at opposite upper and lower sides of the mounting portion 24B on the rear surface of the bezel 22, the wire holder 28 is held mounted in the mounting portion 24B of the LED accommodating portion 24.

Figure 4:
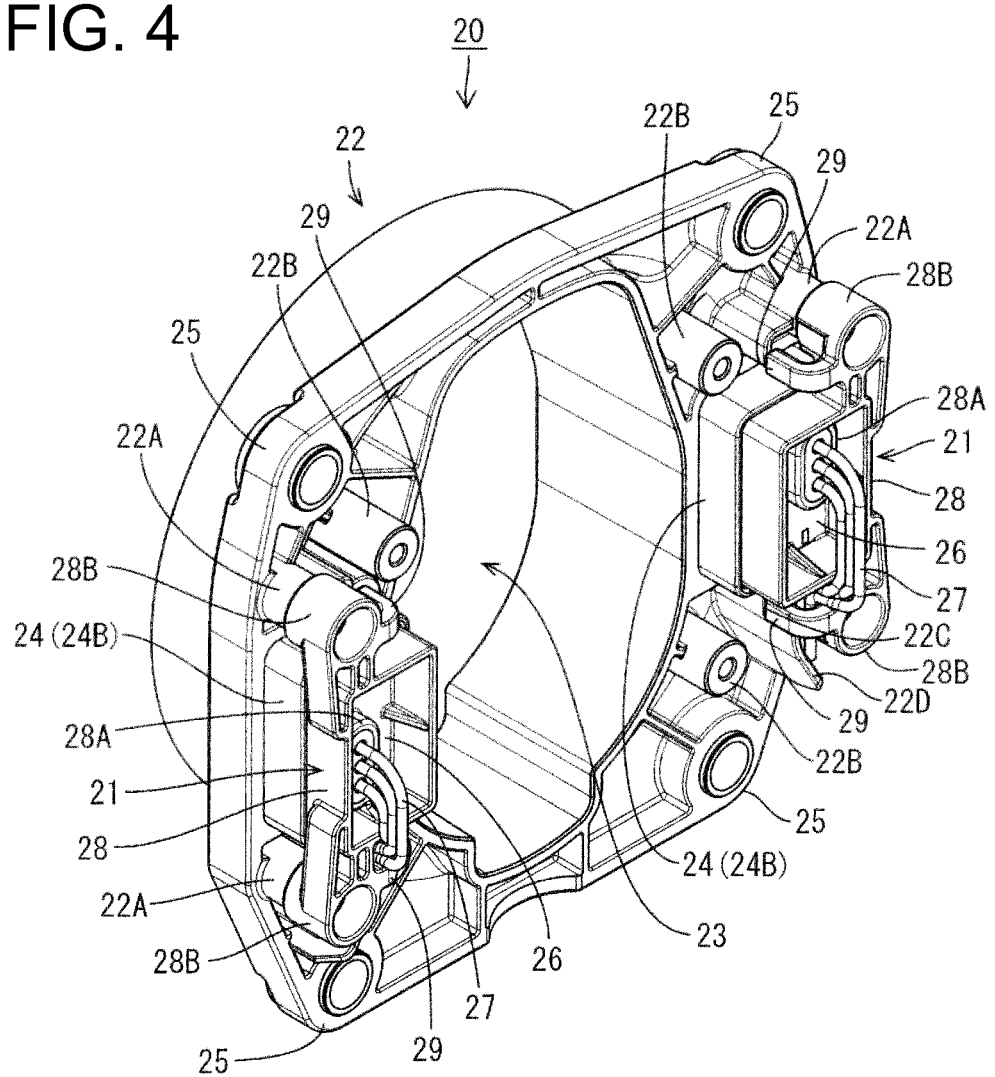
FIG. 4 is a perspective view of the indication device when viewed obliquely from behind.
Figure 5:
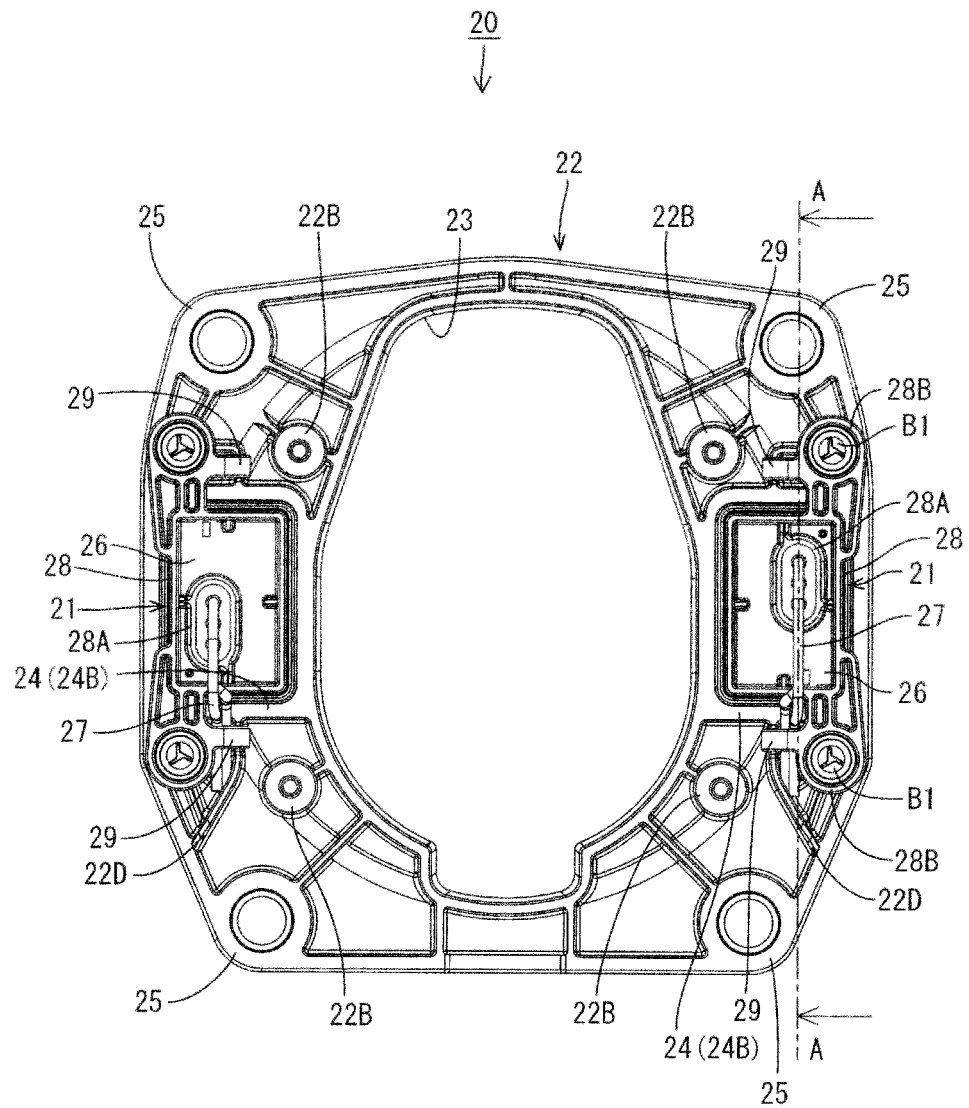
FIG. 5 is a rear view of the indication device.
Figure 6:
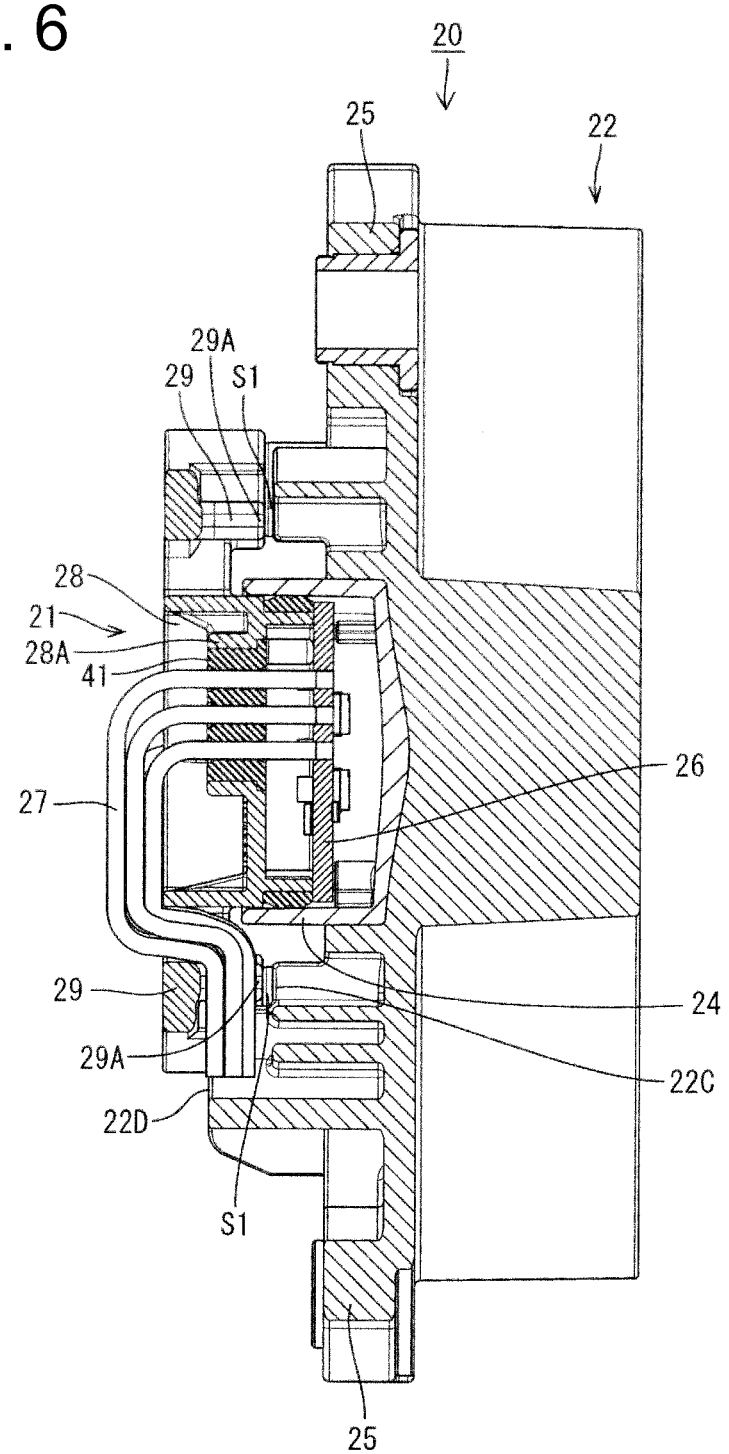
FIG. 6 is a section along A-A of FIG. 5.
Figure 7:
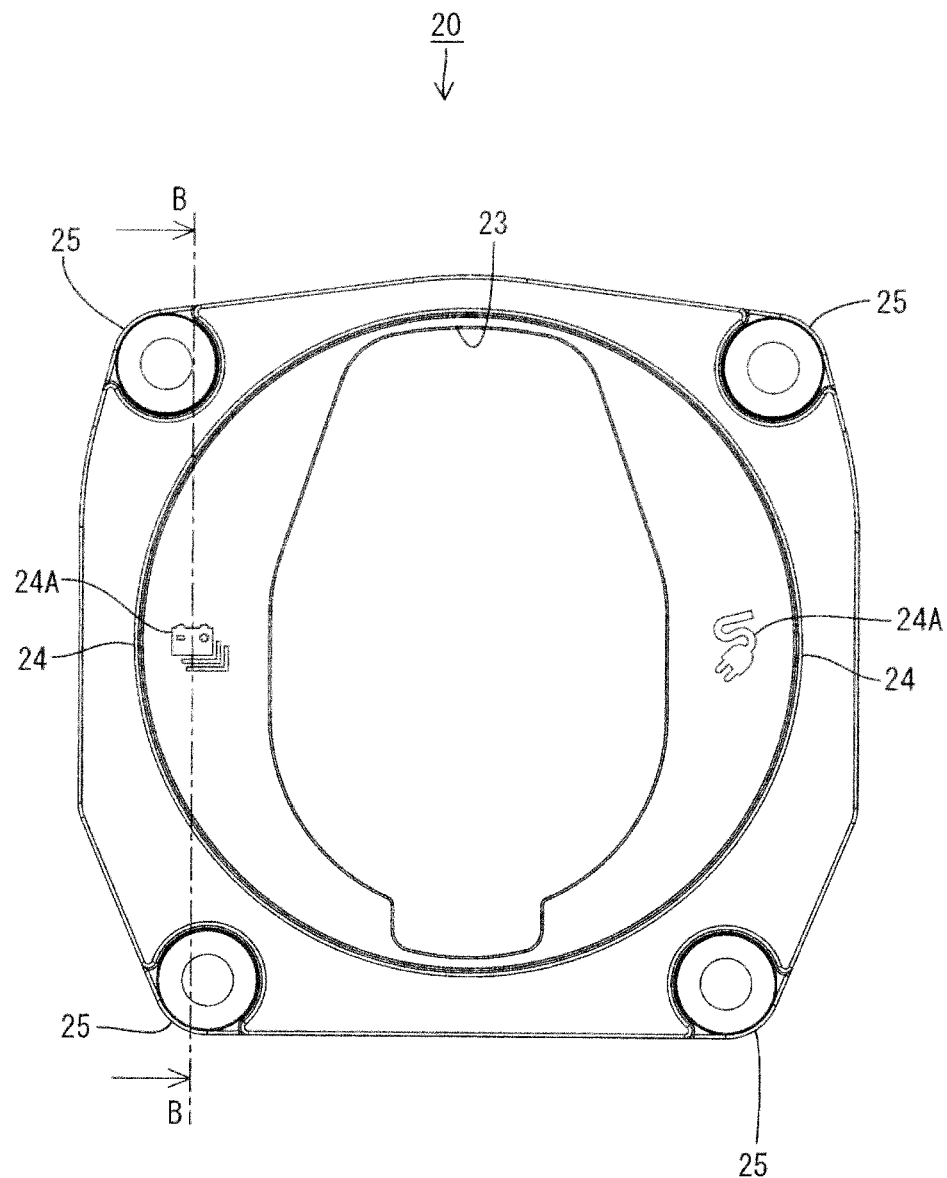
FIG. 7 is a front view of the indication device.

As shown in FIG. 4, at least one hook 29 is formed unitarily to each bolt fastening portion 28B of the wire holder 28. The hook 29 is formed to be bent in a curved state and extends forward after extending laterally from a rear part of the bolt fastening portion 28B. As shown in FIG. 6, the insulated wires 27 drawn out backward from the rubber plug 42 are bent down and forward at a substantially right angle different from 0° or 180°, preferably substantially normal (particularly substantially bent downward and substantially bent forward at a position before the hook 29 and then led out down along an inner side of the hook 29. By doing so, even if the insulated wires 27 are pulled with a strong force, such a force is received by the hook 29. Thus, there is no possibility of the fracture or the like of a joint part with the LED substrate 26.

Figure 8:
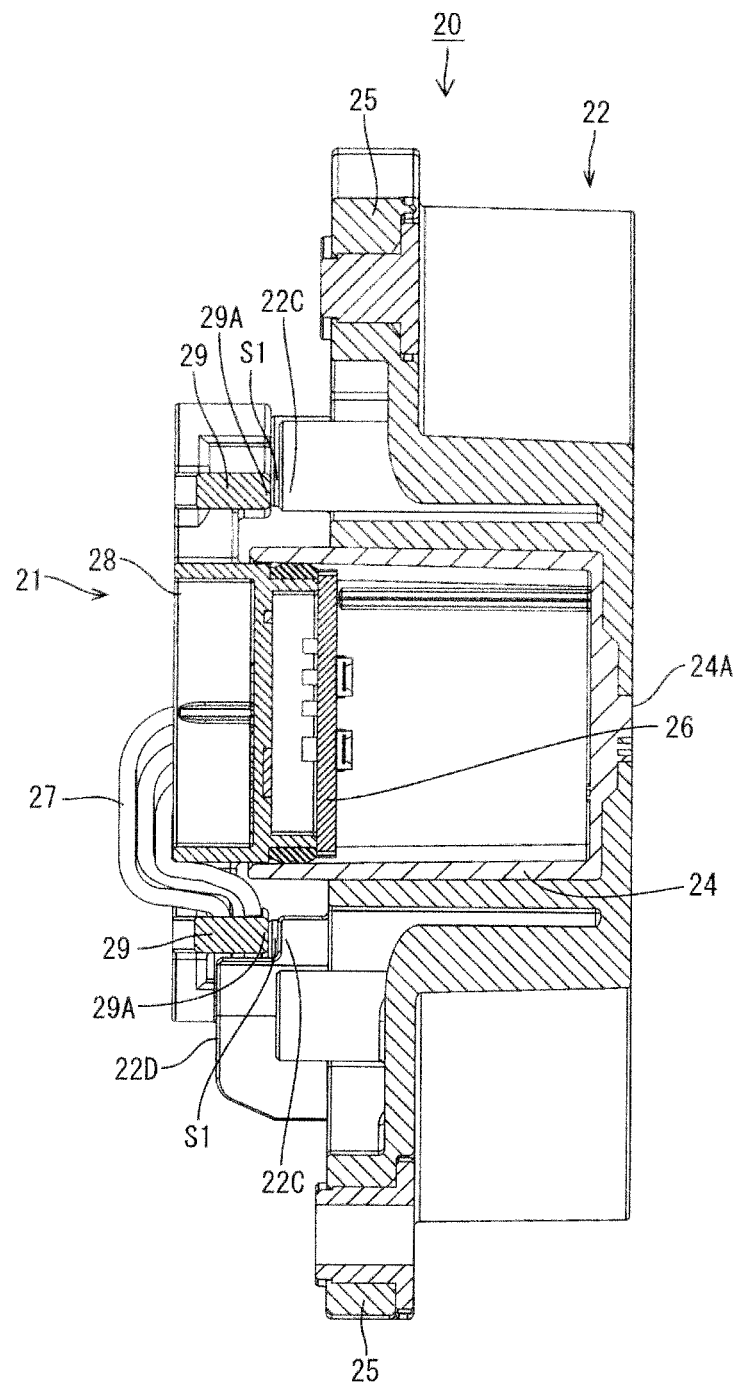
FIG. 8 is a section along B-B of FIG. 7.

As shown in FIG. 8, a clearance S1 is formed between an extending end part 29A of the hook 29 and a rear end edge 22C of the bezel 22. The clearance S1 further has a smaller diameter than the insulated wires 27. Thus, the insulated wires 27 do not come out to be detached from the clearance S1.

Figure 9:
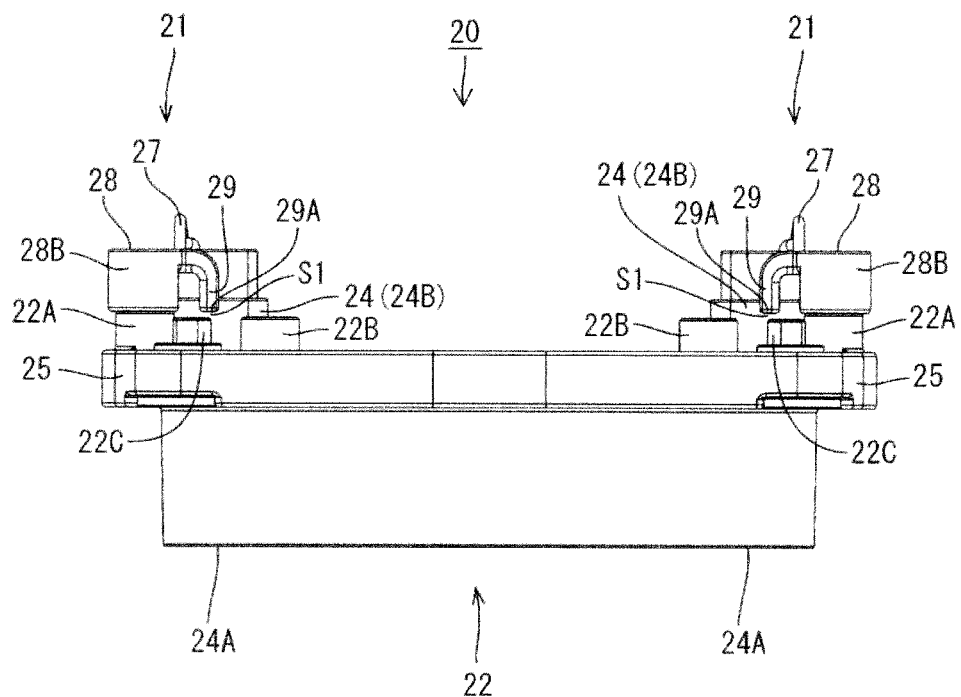
FIG. 9 is a plan view of the indication device.

The hooks 29 also are arranged on the upper side of the wire holder 28 as shown in FIG. 9. The insulated wires 27 drawn out backward from the rubber plug 42 also can be led out in a different direction (e.g. up). At this time, a clearance S1 also is formed between the extending end part 29A of the hook 29 and the rear edge 22C of the bezel 22, and the insulated wires 27 do not come out from this clearance S1.

Figure 10:
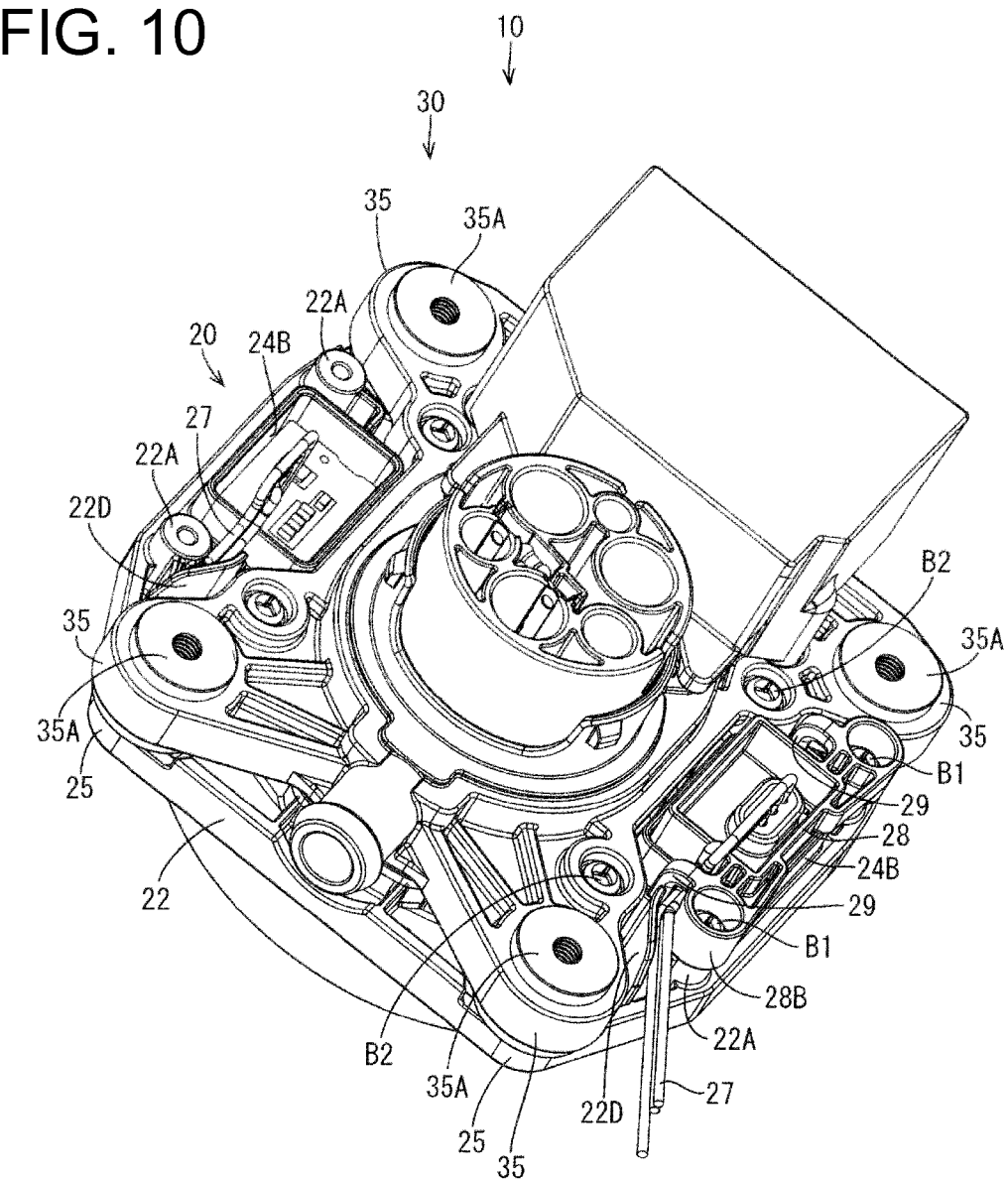
FIG. 10 is a perspective view showing an arranged state of wires at an inner side of a hook.
Figure 11:
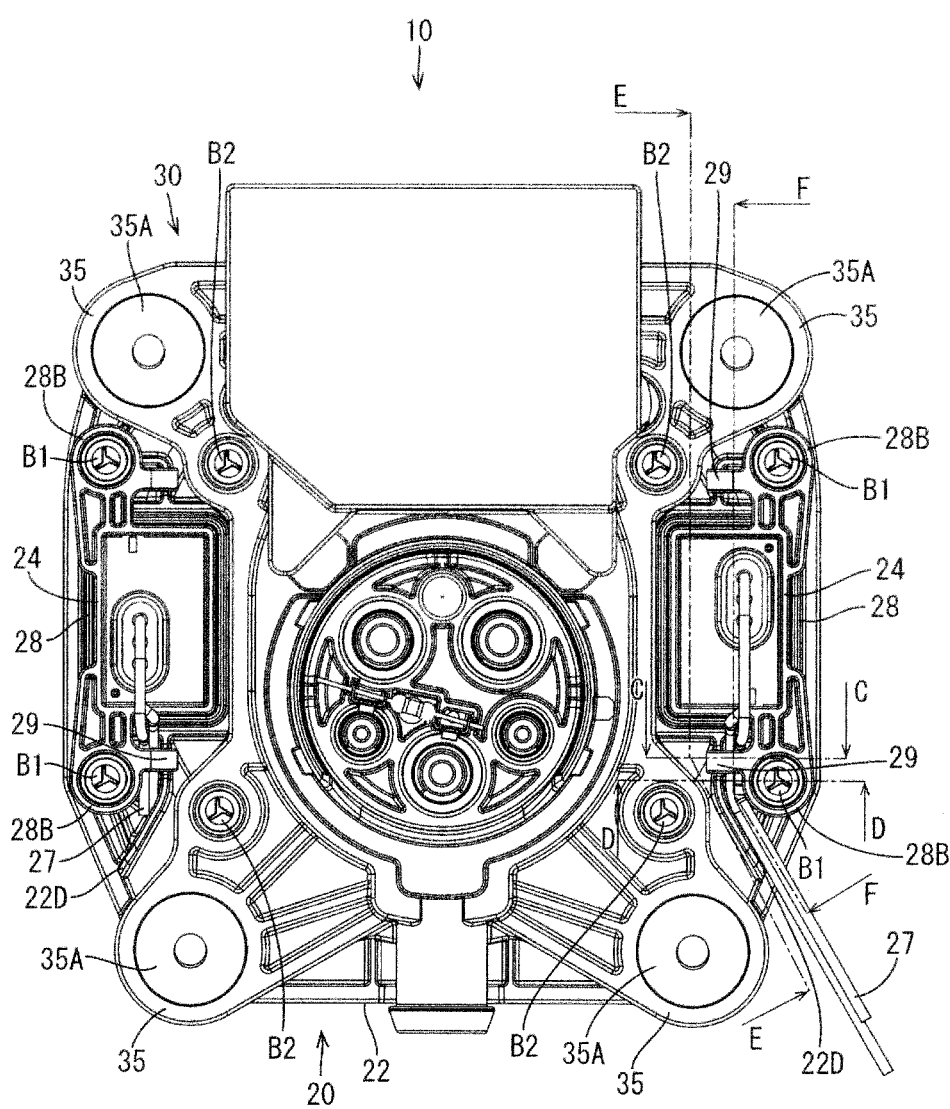
FIG. 11 is a rear view of the vehicle-side connector.
Figure 12:
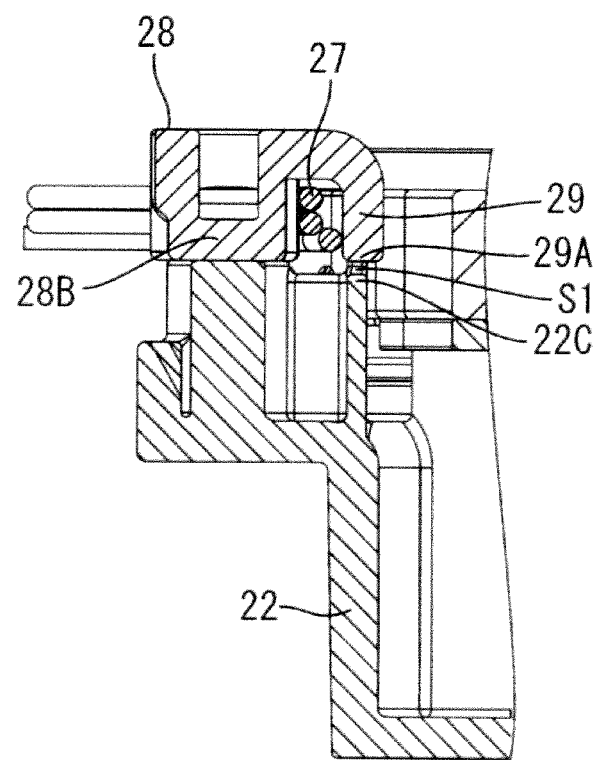
FIG. 12 is a section along C-C of FIG. 11.
Figure 13:
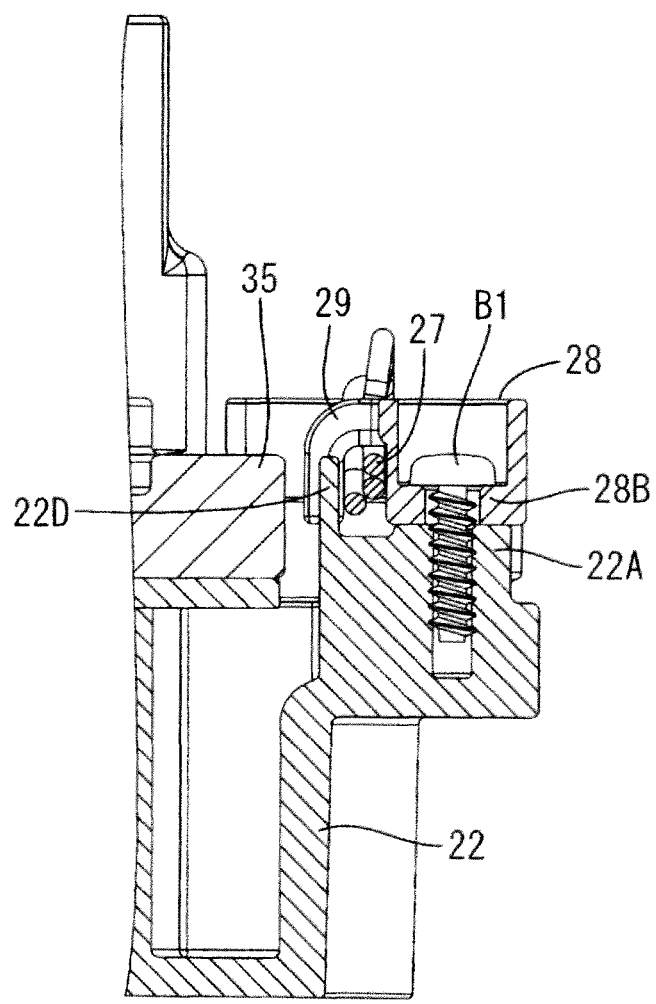
FIG. 13 is a section along D-D of FIG. 11.
Figure 14:
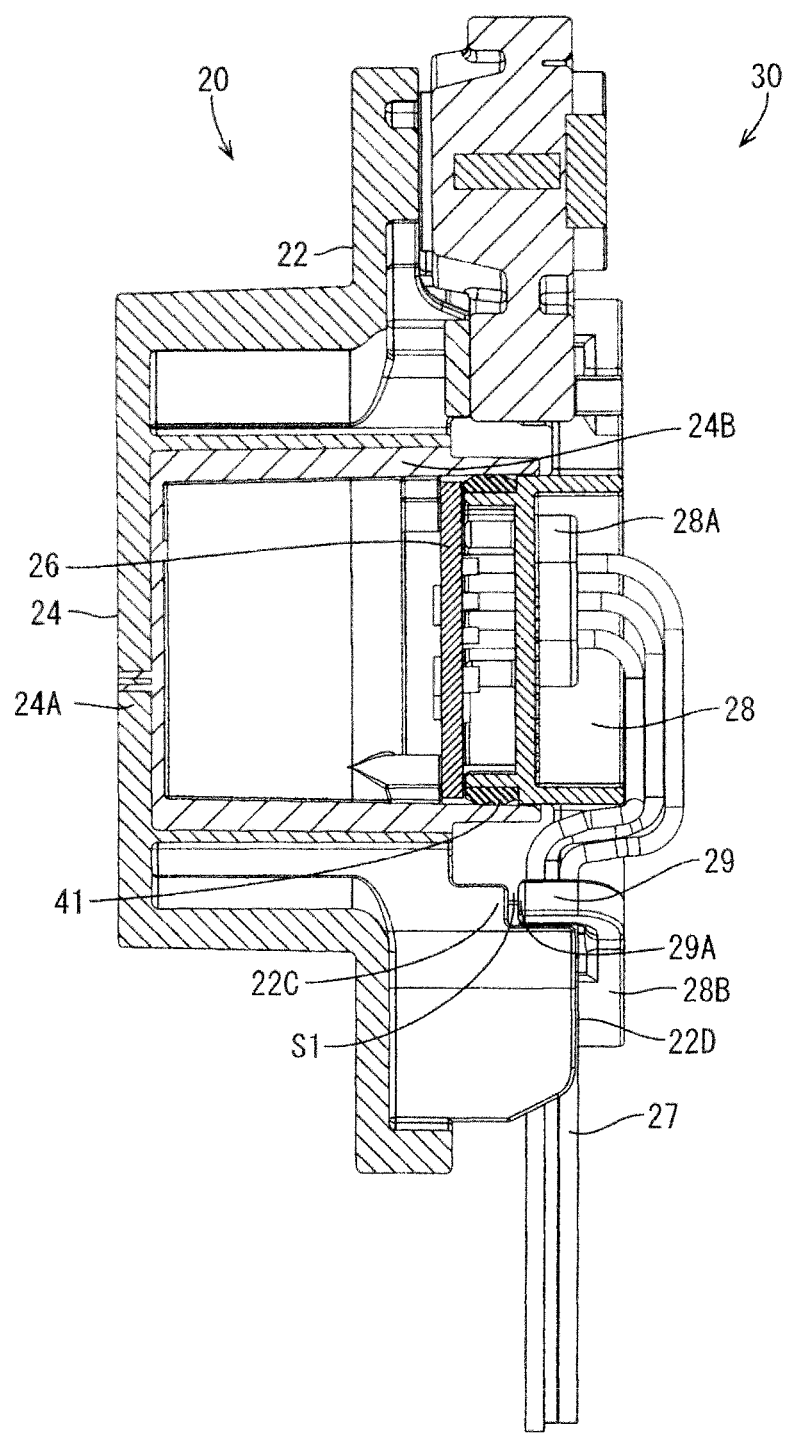
FIG. 14 is a section along E-E of FIG. 11.
Figure 15:
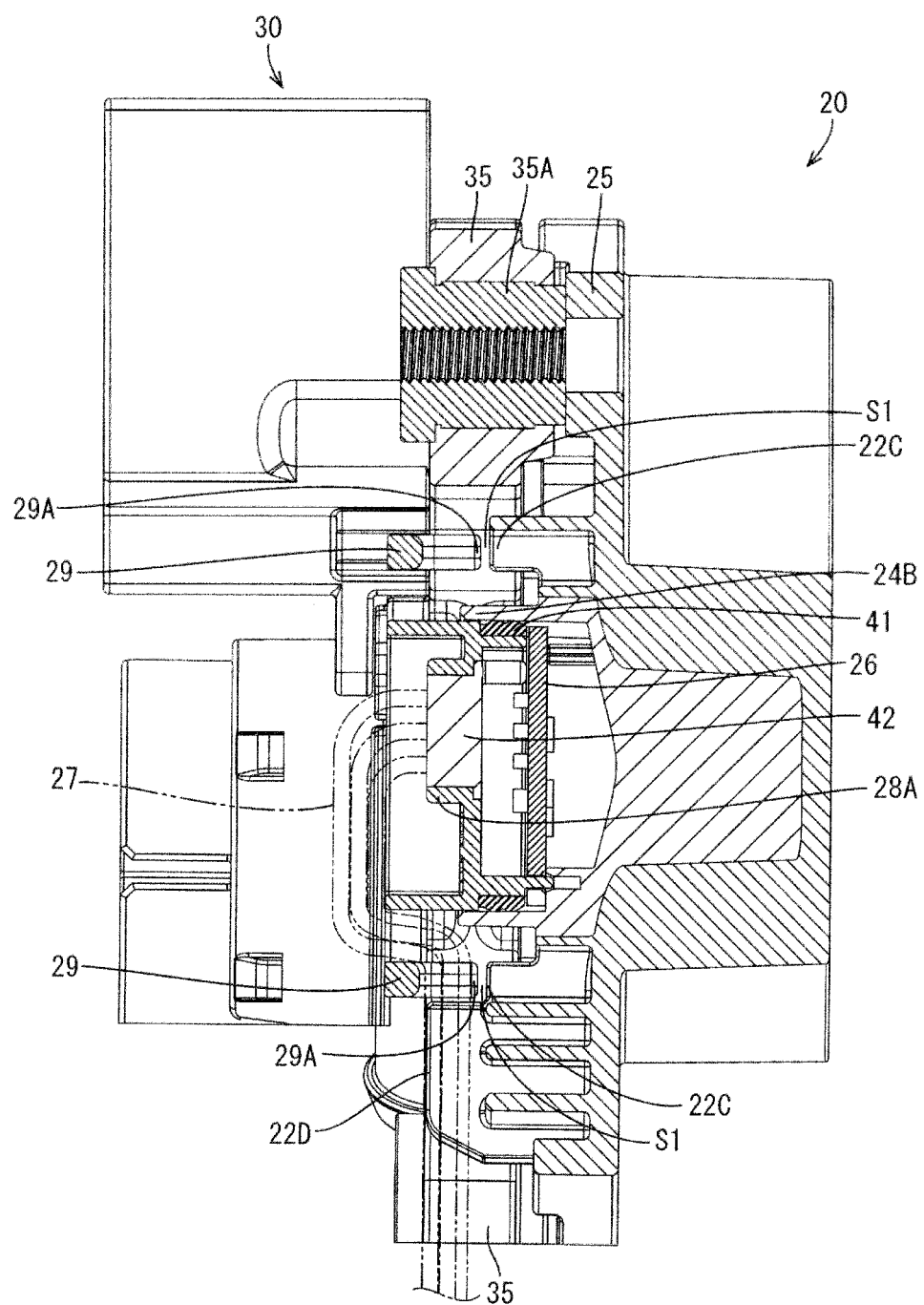
FIG. 15 is a section along F-F of FIG. 11.

As shown in FIGS. 10 and 11, a partition wall 22D for partitioning the wire holder 28 and the mounting portion 35 is formed between the wire holder 28 and the mounting portion 35. The insulated wires 27 are arranged between the hook 29 and the bolt fastening portion 28B as shown in FIGS. 12 and 13, and are guided obliquely down along the partition wall 22D, as shown in FIG. 11. As shown in FIGS. 14 and 15, the partition wall 22D extends continuously down from the rear end edge part 22C substantially facing the extending end 29A of the hook 29 and projects farther back than the rear edge 22C.

The LED indication device 20 is assembled by inserting the insulated wires 27 through the rubber plugs 42 in advance. Cores of the insulated wires 27 are exposed by removing the insulation coatings at ends of the wires 27 and are connected to the LED substrates 26. The LED indicators 21 are formed by mounting the rubber plugs 42 into the rubber plug mounting portions 28A and mounting the LED substrates 26 into front end parts of the mounting portions 24B of the LED accommodating portions 24.

Figure 16:
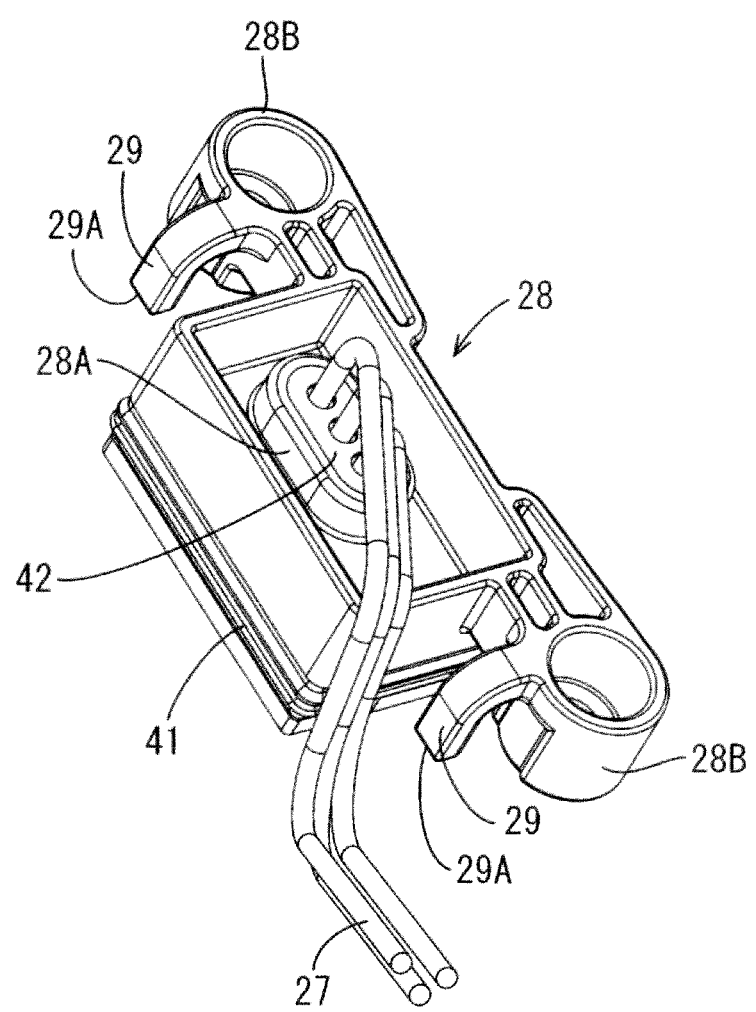
FIG. 16 is a perspective view showing a state before the wires are accommodated at the inner side of the hook when viewed obliquely from behind.
Figure 17:
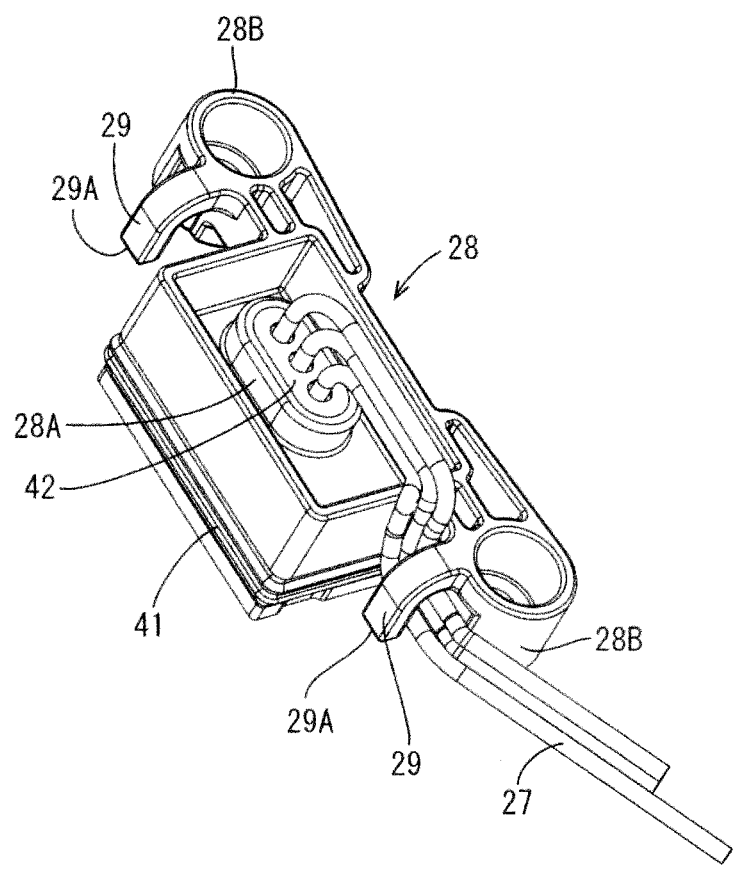
FIG. 17 is a perspective view showing a state after the wires are accommodated at the inner side of the hook when viewed obliquely from behind.
Figure 18:
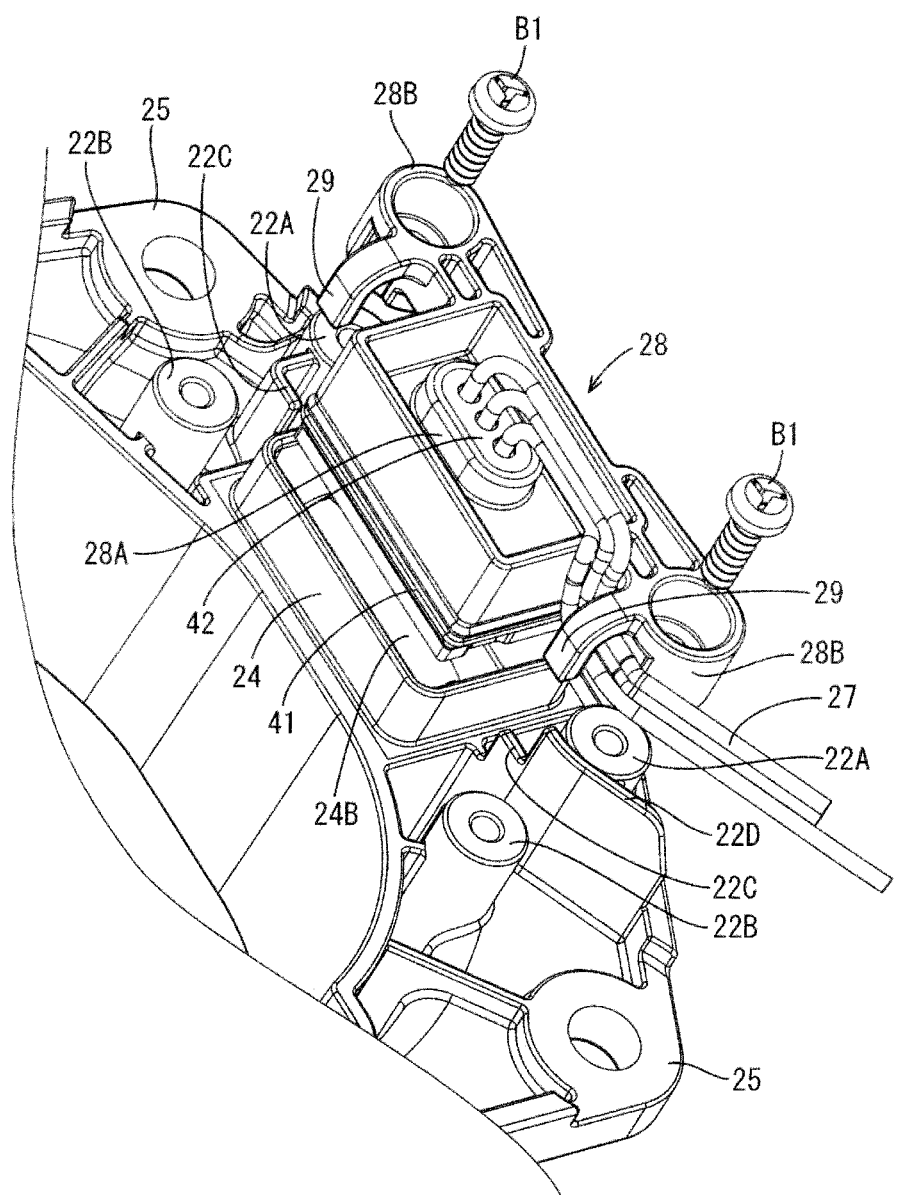
FIG. 18 is a perspective view showing a state before an LED indicator, in which the wires are accommodated at the inner side of the hook, is accommodated into an LED accommodating portion when viewed from an outer side of the hook.
Figure 20:
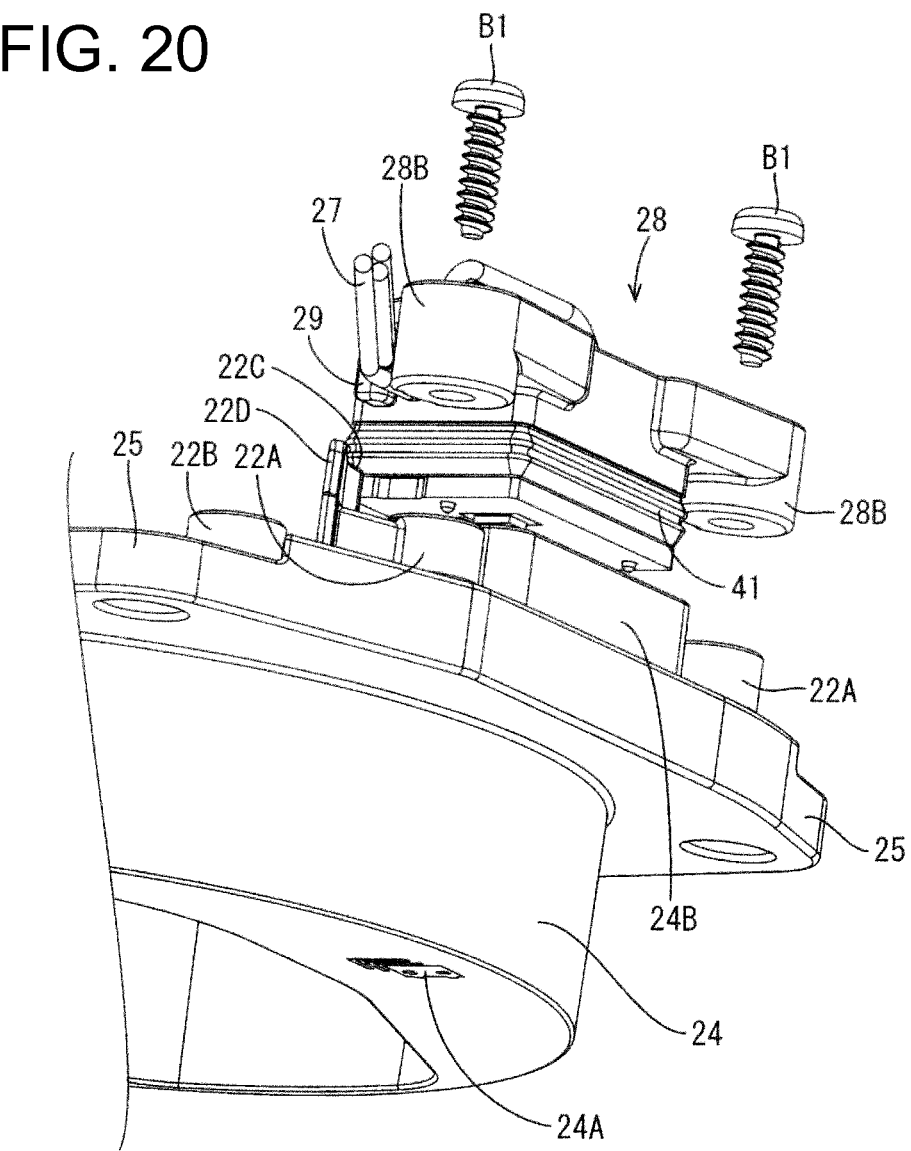
FIG. 20 is a perspective view showing the state before the LED indicator, in which the wires are accommodated at the inner side of the hook, is accommodated into the LED accommodating portion when viewed from the inner side of the hook.

The insulated wires 27 are bundled as shown in FIG. 16 when mounting the LED indicator 21 into the bezel 22 and the LED indicator 21 is mounted into the LED accommodating portion 24 with the insulated wires 27 inserted between the hook 29 and the bolt fastening portion 28B, as shown in FIG. 17. Then, as shown in FIGS. 18 and 20, the bolts B1 are inserted through the respective bolt fastening portions 28B and tightened into the respective fastening portions 22A. At this time, the insulated wires 27 are arranged between the hook 29 and the bolt fastening portion 28B, and are not caught between the bolt fastening portion 28B and the fastening portion 22A.

Figure 19:
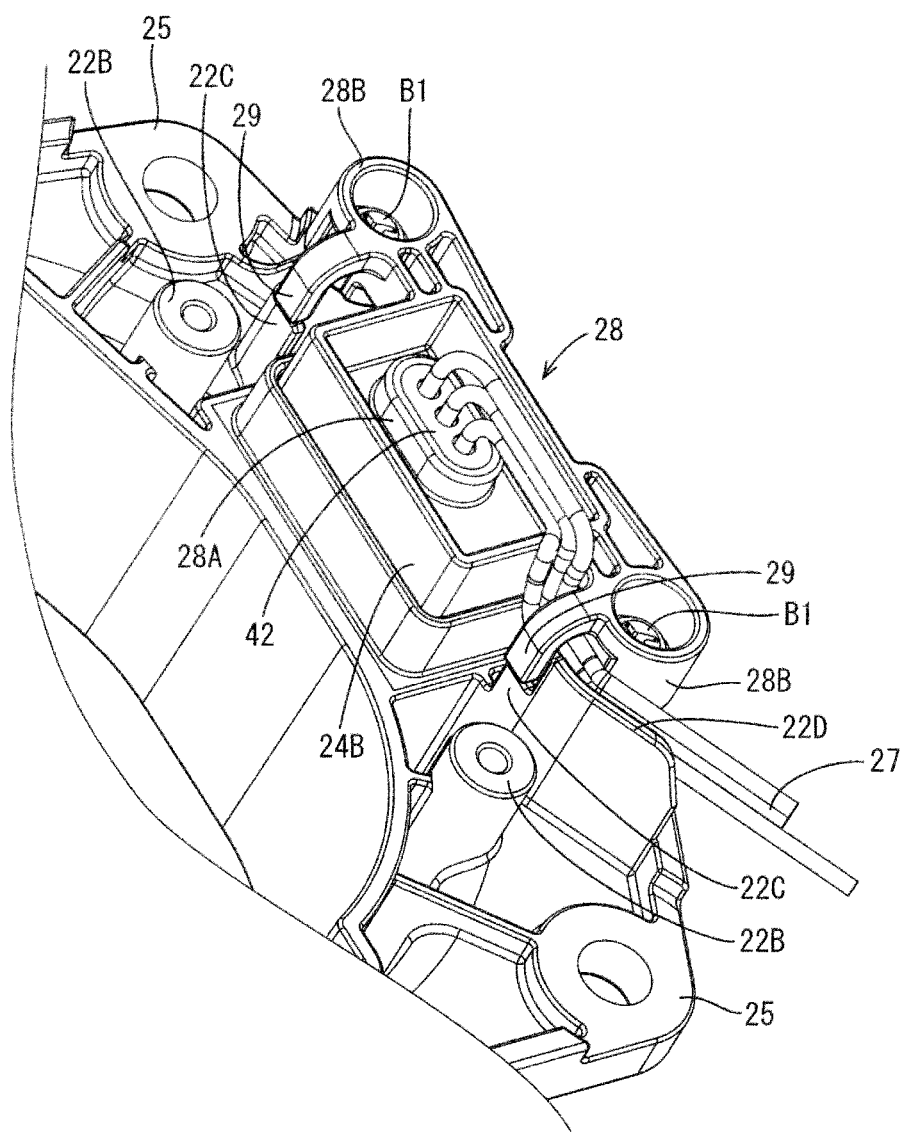
FIG. 19 is a perspective view showing a state after the LED indicator, in which the wires are accommodated at the inner side of the hook, is accommodated into the LED accommodating portion when viewed from the outer side of the hook.
Figure 21:
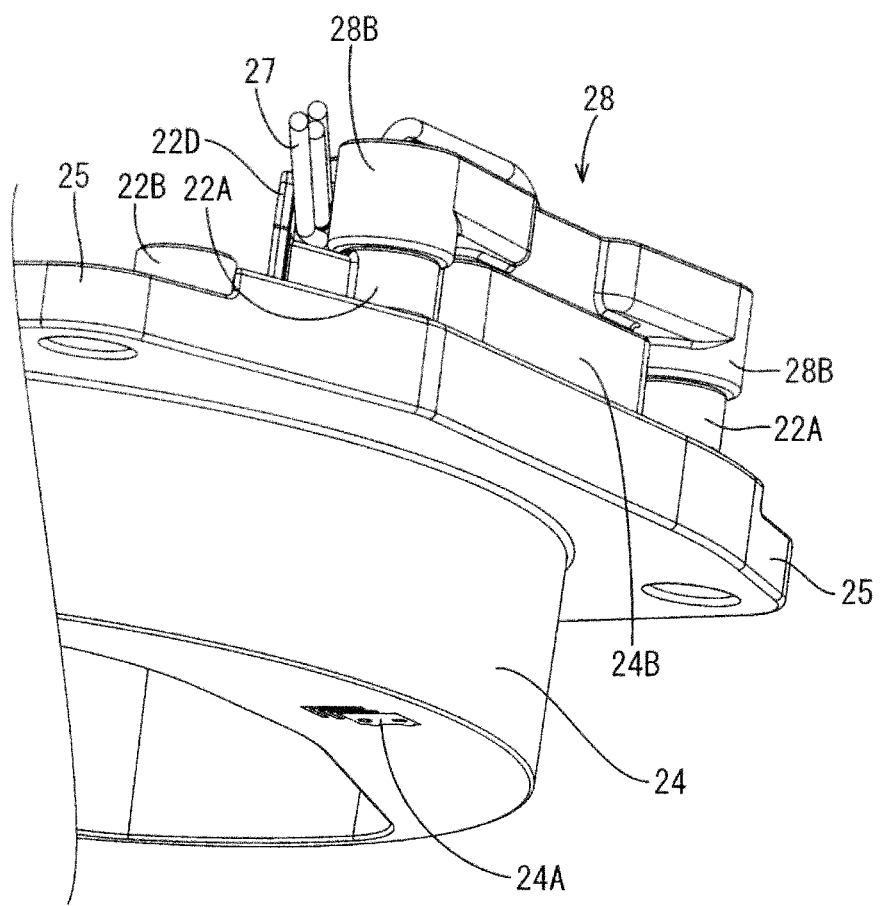
FIG. 21 is a perspective view showing the state after the LED indicator, in which the wires are accommodated at the inner side of the hook, is accommodated into the LED accommodating portion when viewed from the inner side of the hook.

In this way, the LED indicator 21 is bolted in the LED accommodating portion 24, as shown in FIGS. 19 and 21, and the LED indicator 21 is mounted into the bezel 22 to form the LED indication device 20. The hook 29 of the wire holder 28 holds the insulated wires 27 against a pulling force on the insulated wires 27. Further, as a secondary effect obtained by hooking the insulated wires 27 on the hook 29, the insulated wires 27 do not stand in the way and operability is good when the fastening portions 22A and the bolt fastening portions 28B are bolted together.

Subsequently, the fitting tube 31 of the housing main body 30 and the protection wall 34 are fit from behind into the insertion hole 23 of the LED indication device 20 and the packing 40 is sandwiched or interposed between the flanges 25 of the LED indication device 20 and the mounting portions 35 of the housing main body 30. At this time, the insulated wires 27 are arranged between the partition walls 22D and the bolt fastening portions 28B and do not move toward the fastening portions 22B and are not caught between the mounting portions 35 and the fastening portions 22B. Further, the housing main body 30, the LED indication device 20 and the housing main body 30 are fixed together by tightening the bolts B2 (see FIG. 1) into the respective fastening portions 22B (see FIG. 4) from behind. Thereafter, the vehicle-side terminals are inserted into the terminal accommodating portion 32 and a retainer (not shown) is mounted into the housing main body 30 to retain the vehicle-side terminals. Further, the vehicle-side connector 10 is fixed to the body of the vehicle by inserting bolts through the respective mounting portions 35 of the housing main body 30 and tightening them into the body.

As described above, the insulated wires 27 drawn out from the LED indicators 21 may be pulled. However, the wire holders 28 hold the insulated wires 27 to prevent damage of joint parts of the LED indicators 21 and the insulated wires 27. Further, the partition walls 22D prevent the insulated wires 27 from moving toward and being caught in the mounting portions 35.

Further, the wire holder 28 includes the hooks 29 cantilevered unitarily from the bolt fastening portions 28B on the peripheral wall of the LED indicator 21, and the insulated wires 27 are arranged between the hook 29 and the bolt fastening portion 28B. Accordingly, even if the insulated wires 27 are pulled strongly and a strong force is applied the hook 29, such a force can be received together with the bolt fastening portion 28B. Thus, the insulated wires 27 are held firmly. Further, the insulated wire 27 are arranged between the hook 29 and the bolt fastening portion 28B and cannot be caught in the bolt fastening portion 28B.

The clearance S1 between the extending end 29A of the hook 29 and the LED indication device 20 is smaller than the diameter of insulated wires 27. Accordingly, even if the insulated wires 27 are about to separate from the hook 29, they cannot pass through the clearance S1 between the extending end 29A of the hook 29 and the LED indication device 20.

The partition wall 22D is connected to the rear end edge 22C of the LED indication device 20 facing the extending end 29A of the hook 29. Accordingly, the insulated wires 27 are guided by the partition wall 22D immediately after being hooked on the hook 29.

The partition wall 22D is between the bolt fastening portion 28B and the mounting portion 35. According to this configuration, the insulated wires 27 can be arranged more easily between the partition wall 22D and the bolt fastening portion 28B.

A second embodiment of the invention is described with reference to FIGS. 22 to 26. In a vehicle-side connector 110 of this embodiment, the configuration of the LED indication device 20 of the first embodiment is changed, and an LED indication device is assembled with the same housing main body 30 as in the first embodiment. Components corresponding or similar to those of the first embodiment are denoted by reference signs obtained by adding 100 to numbers of the reference signs used in the first embodiment, and overlapping or similar configurations, functions and/or effects are not described.

Figure 22:
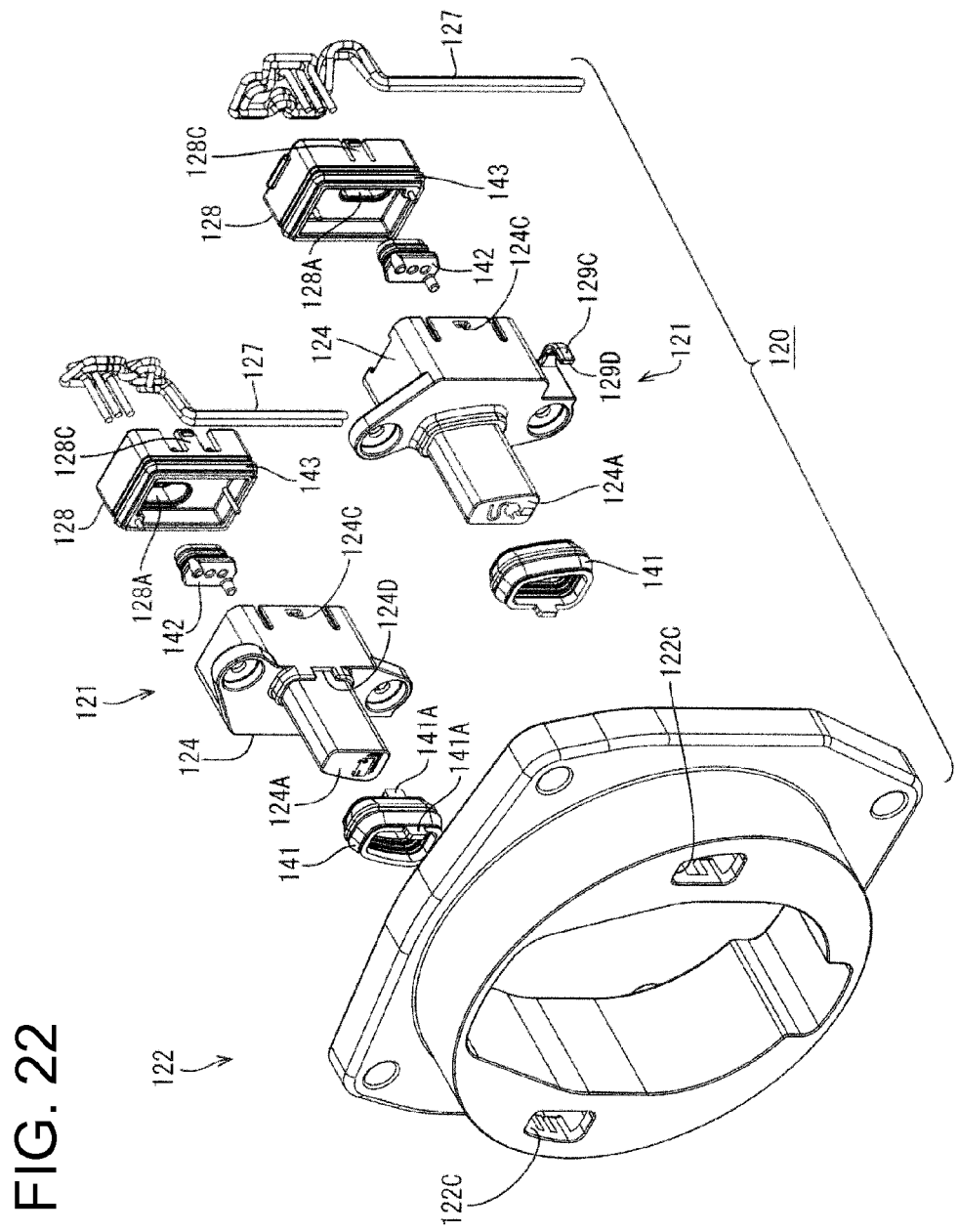
FIG. 22 is an exploded perspective view of an indication device in a second embodiment when viewed obliquely from front

The vehicle-side connector 110 includes an LED indication device 120 and a housing main body 30. As shown in FIG. 22, the LED indication device 120 includes LED indicators 121 and a bezel 122. Each LED indicator 121 includes an LED accommodating portion 124 in which an LED substrate (not shown) is built, a fluid- or waterproof member 141, a rubber plug 142, a wire holder 128, insulated wires 127 and the like.

Unlike the LED accommodating portions 24 of the first embodiment, the LED accommodating portions 124 of this embodiment are not integral or unitary with the bezel 122, but are formed separately from the bezel 122. Left and right LED accommodating portions 124 are in a mirror image relationship. Further, unlike the light emitters 24A of the first embodiment, light emitters 124A of this embodiment are formed unitarily to the LED accommodating portions 124 and the pair left and right light emitters 124A are in a substantially mirror image relationship. Thus, the bezel 122 is formed with left and right light emitter accommodating holes 122C into which left and right light emitters 124A are to be accommodated.

The light emitter 124A projects forward from the front surface of the LED accommodating portion 124 and defines a column shape with a substantially trapezoidal cross-section. The substantially trapezoidal shape has upper and lower bases, one side at a right angle to the lower base and one side at an acute angle to the lower base. Although the bolt fastening portions 28B are provided on the peripheral wall of the wire holder 28 in the first embodiment, bolt fastening portions 124E are provided on a peripheral wall of the LED accommodating portion 124 in this embodiment. Further, the LED accommodating portion 124 is provided with a rearwardly open mounting portion 124B, and the wire holder 128 is mounted into this mounting portion 124B.

The substantially annular fluid- or waterproof members 141 are fit on the outer peripheral surfaces of the column-shaped light emitters 124A. The waterproof members 141 are formed as common components to be mounted on the left and right light emitters 124A, and the left and right fluid- or waterproof members 141 are arranged to be substantially plane-symmetrical with respect to the left and right light emitters 124A. Two error mounting preventing ribs 141A are formed on opposite front and rear sides of the waterproof member 141. This rib 141A is fit into a recess 124D provided on the LED accommodating portion 124 when the fluid- or waterproof member 141 is mounted in a proper posture onto the light emitter 124A. Thus, if an attempt is made to mount the fluid- or waterproof member 141, for example, in a vertically inverted posture onto the light emitter 124A, the ribs 141A are not fitted into the recesses 124D and mounting in an improper posture can be confirmed.

The wire holder 128 includes left and right lock pieces 128C, and is held in the LED accommodating portion 124 by fitting the lock pieces 128C into left and right lock holes 124C formed in the LED accommodating portion 124 for locking. A seal ring 143 is fit on the outer peripheral surface of the wire holder 128 and provides sealing between a peripheral wall of the wire holder 128 and an inner wall of the mounting portion 124B of the LED accommodating portion 124.

Figure 23:
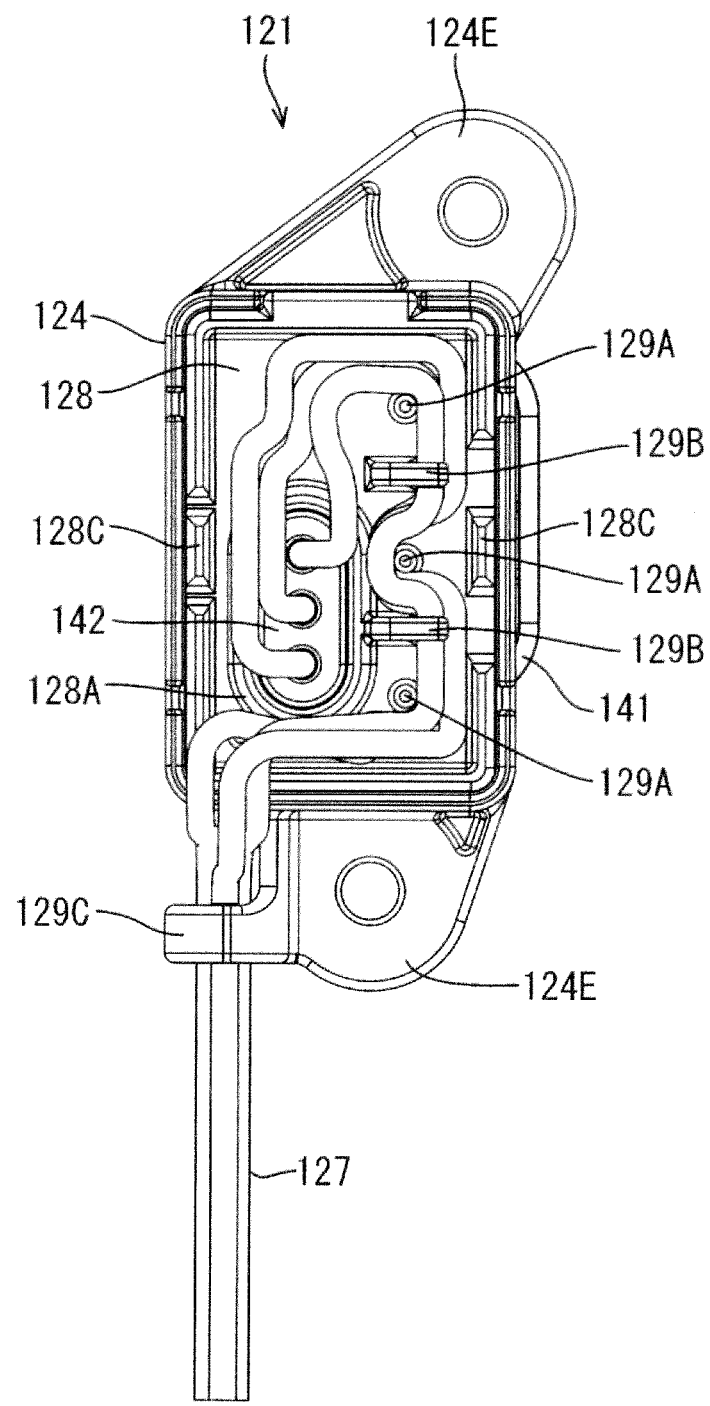
FIG. 23 is a rear view of an LED indicator.

As shown in FIG. 23, the insulated wires 127 are drawn out backward from the rubber plug 142 mounted in a rubber plug mounting portion 128A on the rear surface of the wire holder 128. The insulated wires 127 are guided in a specified direction along direction restricting pieces 129A on the rear surface of the wire holder 128 and are prevented from coming out backward by being passed along inner sides of detachment preventing pieces 129B. A hook 129C is formed unitarily to the bolt fastening portion 128B of the wire holder 128, and the insulated wires 127 drawn out from the lower end of the wire holder 128 are led down along an inner side of the hook 129C.

Figure 24:
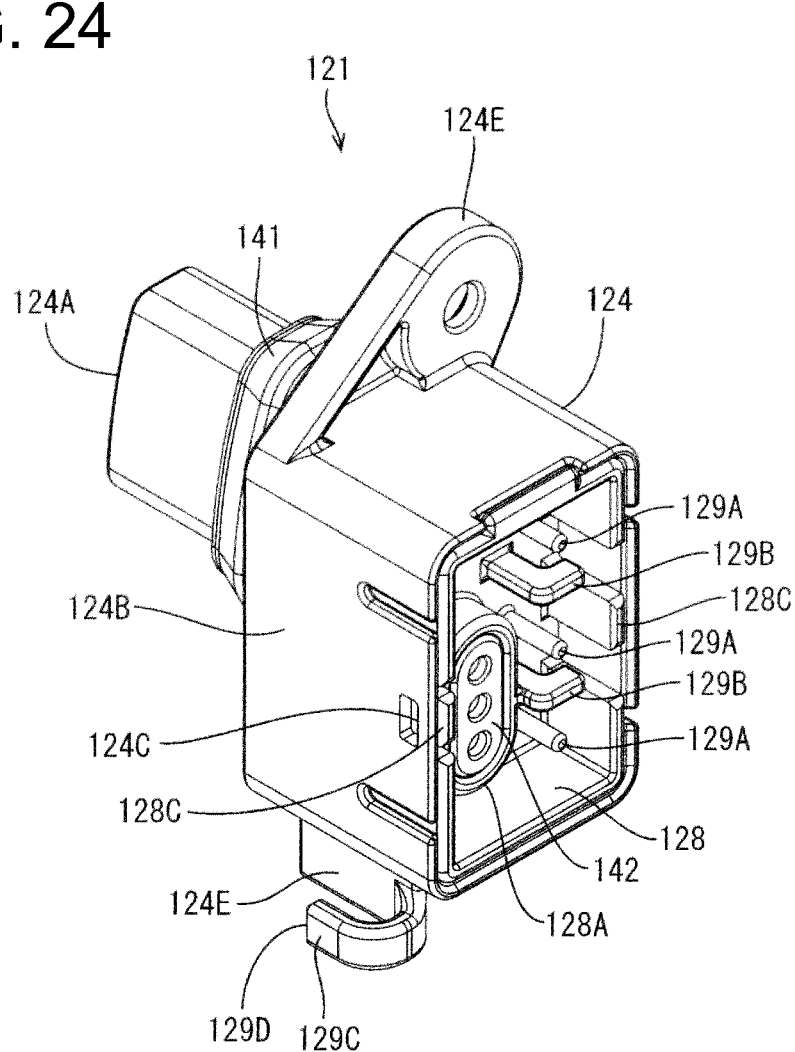
FIG. 24 is a perspective view of the LED indicator in a wire removed state when viewed obliquely from behind.

As shown in FIG. 24, the direction restricting pieces 129A are formed into round bars projecting back from the rear surface of the wire holder 128. Further, the detachment preventing pieces 129B project from the rear surface of the wire holder 128 and have a substantially L shape. The projecting ends of the detachment preventing pieces 129B are formed into an undercut shape projecting toward the lock piece 128C at a side opposite to the rubber plug mounting portion 128A, and mold removal holes for forming the undercut shapes are formed adjacent to opposite upper and lower sides of the lock piece 128C. Specifically, the lock piece 128C formed between the upper and lower mold removal holes is made deflectable by the mold removal holes.

Figure 25:
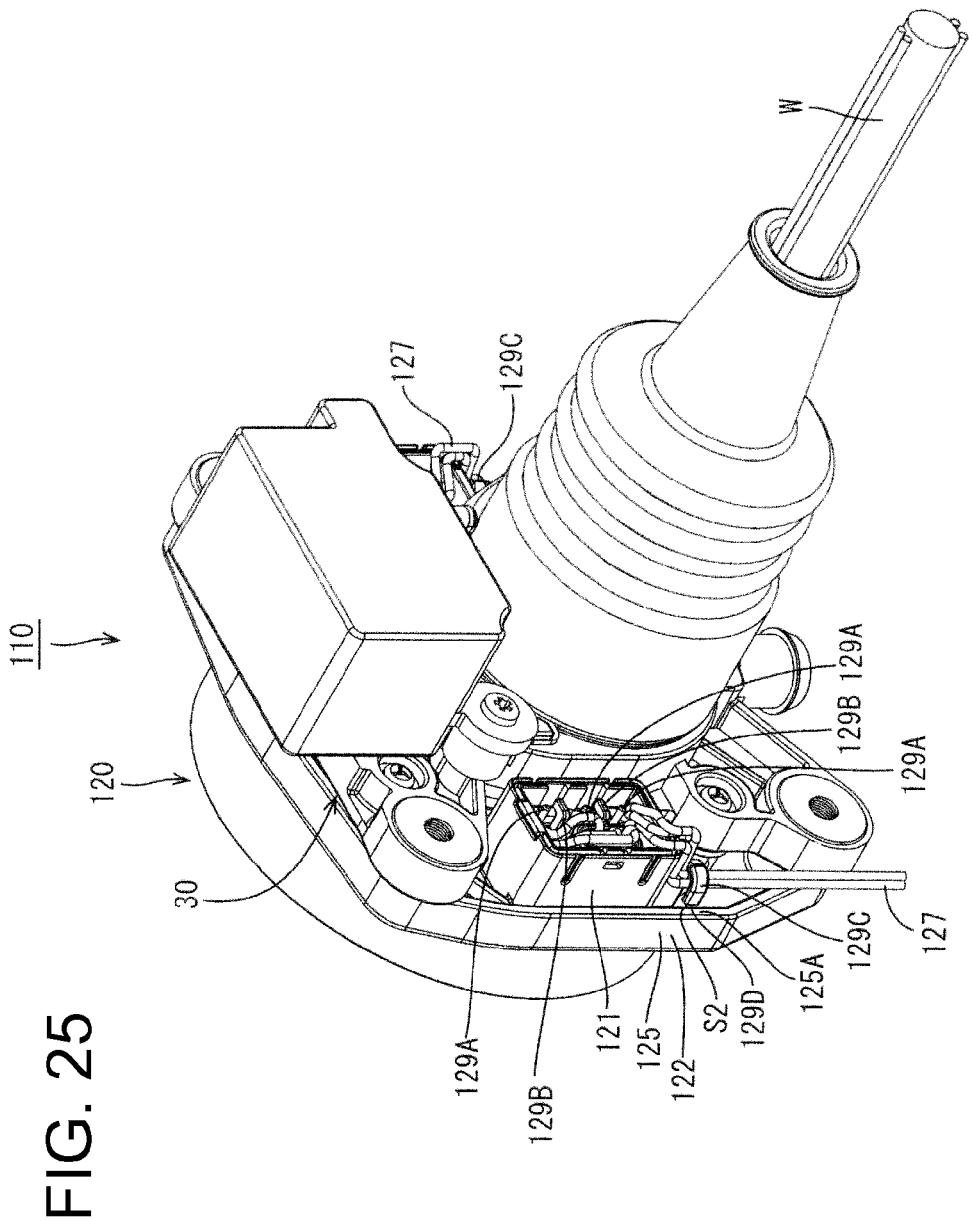
FIG. 25 is a perspective view of a vehicle-side connector when viewed obliquely from behind.

As shown in FIG. 23, the hook 129C is unitary to the bolt fastening portion 124E. Further, as shown in FIG. 24, the hook 129C extends from the bolt fastening portion 124E and is folded into a substantially U shape to define a hook. As shown in FIG. 25, in a state where the LED indicators 121 are mounted into the bezel 122, clearances S2 smaller than a diameter of the insulated wires 127 are formed between extending end parts 129D of the hooks 129C and a rear end edge 125A of a flange 125 of the bezel 122. Thus, the insulated wires 127 do not come out of these clearances S2.

As shown in FIG. 23, the direction restricting pieces 129A and the detachment preventing pieces 129B are provided linearly and alternately substantially side by side. FIG. 23 shows a state where the insulated wires 127 drawn out up from the rubber plug 142 are bent right, passed down along the right side of the upper direction restricting piece 129A, passed along the inner side of the detachment preventing piece 129B, returned to the right side along the left side of the middle direction restricting piece 129B, passed along the inner side of the detachment preventing piece 129B and along the right side of the lower direction restricting piece 129A, bent leftward, bent further down and substantially passed along the inner side of the hooking piece 129C.

According to this embodiment, even if the insulated wires 127 drawn out from the LED indicator 121 are pulled, a force pulling the insulated wires 127 can be withstood by the hook 129C. Even if the hook 129C is fractured, the force pulling the insulated wires 127 can be withstood by the one or more, particularly the plurality of detachment preventing pieces 129B. By adopting this arrangement, the insulated wires 127 can be held more firmly in the wire holder 128 and the damage of the joint part of the LED indicator 121 and the insulated wires 127 can be prevented when the insulated wires 127 drawn out from the LED indicator 121 are pulled. Further, since the insulated wires 127 are arranged in a meandering manner by the plurality of direction restricting pieces 129A and the plurality of detachment preventing pieces 129B, this arrangement is more effective than in the first embodiment when the insulated wires 127 drawn out from the LED indicator 121 are long. The reason for that is that extra lengths of the insulated wires 127 can be taken up before the insulated wires 127 are hooked on the hook 129C.

Further, the LED indicator 121 includes the LED accommodating portion 124 into which the wire holder 128 is to be mounted, and the hook 129C is cantilevered on the LED accommodating portion 124. The clearance S2 that is smaller than the diameter of the insulated wires 127 is formed between the extending end part 129D of the hook 129C and the rear edge 125A of the flange 125 of the bezel 122 facing this extending end part 129D. According to such a configuration, even if the insulated wires 127 are about to be separated from the hook 129C, the detachment of the insulated wires 127 from the clearance S2 formed between the extending end part 129D of the hook 129C and the rear end edge 125A of the flange 125 of the bezel 122 can be prevented.

Further, the hook 129C is unitary to the bolt fastening portion 124E provided on the peripheral wall of the LED accommodating portion 124. According to such a configuration, even if the insulated wires 127 are pulled strongly and a strong force is applied the hook 129C, such a force can be received together with the bolt fastening portion 124E. Thus, the insulated wires 127 can be held firmly held.

The invention is not limited to the above described embodiments. For example, the following embodiments also are included in the scope of the invention.

The hooks (29, 129C) are illustrated in the above embodiments for hooking and holding the insulated wires 27, 127. However, the insulated wires 27, 127 may be held by being sandwiched according to the invention.

The insulated wires 27, 127 formed by covering the cores by the insulation coatings in the above embodiments. However, flat cables or the like may be used.

The hooks are integral or unitary with the bolt fastening portions 28B, 124E in the above embodiments. However, the hooks they may be provided on the peripheral walls of the wire holders 28 or the peripheral walls of the LED accommodating portions 124.

LEDs are illustrated as light sources of the indication device in the above embodiments. However, light bulbs or any other visual indicator may be used as the light sources according to the invention.

The partition walls 22D are connected to the rear end edges 22C of the bezel 22 in the above embodiment. However, partition walls may be separated from the rear end edges 22C of the bezel 22.

What is claimed is:

1. A vehicle-side connector to be connected to a battery of a vehicle, comprising:

a fitting portion into which a charging connector connected to a charger at least partly is fittable, the fitting portion including at least one mounting portion to be mounted to a body of the vehicle;

an indication device mounted into the fitting portion and including at least one indicator, from which at least one wire is drawn;

at least one wire holder provided in the indication device and configured to hold the wire against a pulling force when the wire is pulled; and at least one partition wall between the wire holder and the mounting portion for partitioning the wire holder and the mounting portion.

2. The vehicle-side connector of claim 1, wherein the wire holder includes at least one hook cantilevered from a peripheral wall of the indicator and integral or unitary with a bolt fastening portion, the wire being arranged between the hook and the bolt fastening portion.

3. The vehicle-side connector of claim 2, wherein a clearance is formed between an extending end of the hook and an end edge of the indication device substantially facing the extending end of the hook, the clearance being smaller than a diameter than the wire.

4. The vehicle-side connector of claim 2, wherein the partition wall is connected to the end edge of the indication device substantially facing the extending end part of the hook.

5. The vehicle-side connector of claim 1, wherein the indicator includes an accommodating portion into which the wire holder is mounted, at least one hook cantilevered from the accommodating portion, and a clearance being formed between an extending end of the hook and an end edge of the indication device facing the extending end of the hook, the clearance being smaller than a diameter of the wire.

6. The vehicle-side connector of claim 5, wherein the hook is integral or unitary with a bolt fastening portion provided on a peripheral wall of the accommodating portion.

\* \* \* \* \*